United States Patent
Newman

(10) Patent No.: US 11,276,946 B2
(45) Date of Patent: Mar. 15, 2022

(54) CABLE CONNECTOR SYSTEM AND A METHOD OF CONNECTING ELECTRICAL CABLES

(71) Applicant: TE Connectivity Services GmbH, Schaffhausen (CH)

(72) Inventor: John Anthony Newman, Garner, NC (US)

(73) Assignee: TE CONNECTIVITY SERVICES GMBH, Schaffhausen (CH)

( * ) Notice: Subject to any disclaimer, the term of this patent is extended or adjusted under 35 U.S.C. 154(b) by 0 days.

(21) Appl. No.: 16/819,542

(22) Filed: Mar. 16, 2020

(65) Prior Publication Data

US 2020/0303846 A1 Sep. 24, 2020

Related U.S. Application Data

(60) Provisional application No. 62/821,822, filed on Mar. 21, 2019.

(51) Int. Cl.
| | | |
|---|---|---|
| *H01R 4/70* | (2006.01) | |
| *H01R 43/00* | (2006.01) | |
| *H01R 4/60* | (2006.01) | |
| *H01R 4/36* | (2006.01) | |
| *H01R 9/05* | (2006.01) | |

(52) U.S. Cl.
CPC .............. *H01R 4/70* (2013.01); *H01R 4/36* (2013.01); *H01R 4/60* (2013.01); *H01R 9/05* (2013.01); *H01R 43/005* (2013.01)

(58) Field of Classification Search
CPC ... H01R 4/36; H01R 4/60; H01R 3/70; H01R 9/05; H01R 43/005
See application file for complete search history.

(56) References Cited

U.S. PATENT DOCUMENTS

| | | |
|---|---|---|
| 2,463,145 A | 3/1949 | Buchanan |
| 3,408,620 A | 10/1968 | Damiano |
| 4,795,365 A | 1/1989 | Johnston et al. |

(Continued)

FOREIGN PATENT DOCUMENTS

| | | | |
|---|---|---|---|
| AU | 200179969 | * | 3/2002 |
| AU | 2008202943 A1 | | 2/2009 |

(Continued)

OTHER PUBLICATIONS

International Search Report and the Written Opinion of the International Searching Authority, or the Declaration, in corresponding PCT Application No. PCT/US2020/023076 (dated Jun. 3, 2020).

(Continued)

*Primary Examiner* — Carl J Arbes

(57) ABSTRACT

A cable connector system for connecting electrical cables includes a connector and a plug. The connector includes a connector body and a shear bolt. The connector body includes a connector outer surface and a bolt bore intersecting the connector outer surface at a bore opening. The connector outer surface is curved. The shear bolt is configured to be mounted in the bolt bore to secure an electrical cable in the connector body. The plug includes a head and is configured to be mounted in the bolt bore at the bore opening. The head has a head outer surface and the head outer surface is curved.

25 Claims, 21 Drawing Sheets

(56) References Cited

U.S. PATENT DOCUMENTS

| | | | |
|---|---|---|---|
| 5,000,705 A | | 3/1991 | Kinka et al. |
| 5,035,660 A | | 7/1991 | Werner |
| 5,201,914 A | * | 4/1993 | Rollick .................... H01R 4/36 439/801 |
| 5,256,015 A | | 10/1993 | St. Clair |
| 5,821,463 A | | 10/1998 | Ngo |
| 6,209,424 B1 | * | 4/2001 | Croton .................. F16B 31/021 81/119 |
| 6,495,757 B2 | | 12/2002 | Van Boxstael et al. |
| 6,726,510 B2 | * | 4/2004 | Norbert .................... H01R 4/36 174/135 |
| 6,884,124 B1 | | 4/2005 | Luzzi |
| 7,214,108 B2 | | 5/2007 | Barnett |
| 7,249,982 B1 | | 7/2007 | Craig |
| 7,717,658 B2 | | 5/2010 | Peltier |
| 7,736,187 B2 | | 6/2010 | Yaworski et al. |
| 7,918,690 B2 | | 4/2011 | Yaworski et al. |
| 8,550,842 B1 | | 10/2013 | Gutierrez et al. |
| 8,716,600 B2 | * | 5/2014 | Kehl ........................ H01R 4/70 174/84 R |
| 8,747,170 B2 | * | 6/2014 | Cornelius ............... H01R 11/11 439/798 |
| 8,875,368 B2 | | 11/2014 | O'Sullivan et al. |
| 8,895,942 B2 | * | 11/2014 | Liu ........................ C23C 16/56 250/492.1 |
| 9,270,031 B2 | * | 2/2016 | Portas ..................... H01R 4/10 |
| 9,472,865 B2 | | 10/2016 | Frank |
| 9,559,439 B2 | * | 1/2017 | Jaroschek .......... H01R 13/5213 |
| 9,837,730 B1 | | 12/2017 | Rahman et al. |
| 10,594,075 B2 | | 3/2020 | Yaroslavskiy |
| 2002/0056567 A1 | * | 5/2002 | Boxstael .............. H02G 15/184 174/88 R |
| 2003/0127242 A1 | | 7/2003 | Pilling et al. |
| 2009/0194638 A1 | | 8/2009 | Dennis |
| 2013/0056268 A1 | | 3/2013 | Bumgarner |
| 2014/0209379 A1 | | 7/2014 | Kehl et al. |

FOREIGN PATENT DOCUMENTS

| | | | | |
|---|---|---|---|---|
| DE | 2658996 | A1 | | 6/1978 |
| EP | 1206024 | A1 | | 5/2002 |
| EP | 1280239 | A2 | * | 1/2003 |
| EP | 1914837 | A2 | | 4/2008 |
| GB | 287239 | A | * | 3/1928 |
| GB | 1465997 | A | * | 3/1977 |
| GB | 2036908 | A | | 7/1980 |
| GB | 2319402 | A | | 5/1998 |
| GB | 2421642 | A | | 6/2006 |
| GB | 2443000 | A | * | 4/2008 |
| NL | 8601192 | A | | 12/1987 |
| WO | 97/28577 | | * | 8/1997 |
| WO | 0218803 | A1 | | 3/2002 |
| WO | 2005081689 | A2 | | 9/2005 |

OTHER PUBLICATIONS

Aluminum Shear Bolt Splice ASBS Connectors Data Sheet, TE Connectivity (2 pages) (2018).
Aluminum Shearbolt Splice Connectors Data Sheet, TE Connectivity (2 pages) (2019).
Shearbolt Connectors Data Sheet, Prysmian Group (2 pages) (Oct. 2015).
"Aluminum ShearBolt Connectors #2 AWG Compact to 1000 kcmil Concentric," 9-1773440-4 E247 (Apr. 2012), Raychem, Tyco Electronics Corporation (2 pages).
"Aluminum ShearBolt Connectors #2 AWG Compact to 1000 kcmil Stranded," TE Connectivity Catalogue Page, (1 page) (Admitted prior art).
"Cable Services," (Oct. 2009), Product Catalogue (11 pages).
"Copper ShearBolt Connectors #2 AWG Compact to 1000 kcmil Concentric," 1654972 E214 (Apr. 2012), Raychem, Tyco Electronics Corporation (2 pages).
"Copper ShearBolt Connectors" Instruction Sheet 408-8894, Feb. 20, 2012, Rev F, Tyco Electronics Corporation (1 page).
"MI6×1,5-6g 17A/F 31.75 Long Brass Multi-Shear Bolt with Recessed End" Tyco Electronics UK Ltd., Rev A, PCN No. CB3871-000, Date: Jul. 13, 2006 (1 page).
"Raychem Smart Limiter Cable Protector," 6-1773448-0 E288 (Apr. 2012), Tyco Electronics Corporation (2 pages).
"ShearBolt Connector, Copper, Solid Oil Stop, 2/0 AWG CPT to 500 kcmil CPT" TE Connectivity, Rev H, Drawing No. 1099861, Date: Dec. 7, 2003 (1 page).
"Sicon—The First Cable Connector System with Stepless Shear Bolts," (2008) Pfisterer (6 pages).
"Wrench-Lok® Grounding Grid Connectors" Instruction Sheet 408-9504, Nov. 22, 1995, Rev A, AMP Incorporated, Harrisburg, PA (2 pages).
TE Connectivity "Aluminum ShearBolt Connectors" Instruction Sheet (2 pages) (2020).

* cited by examiner

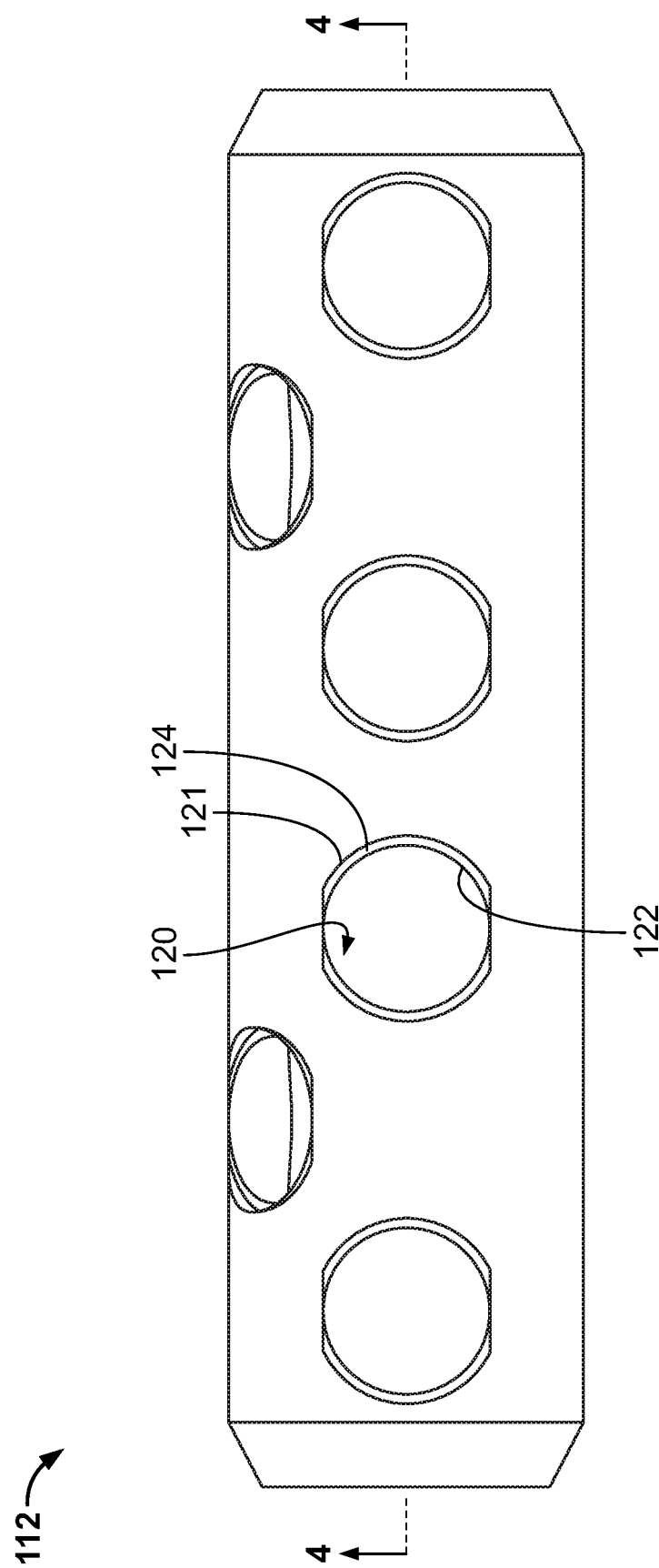

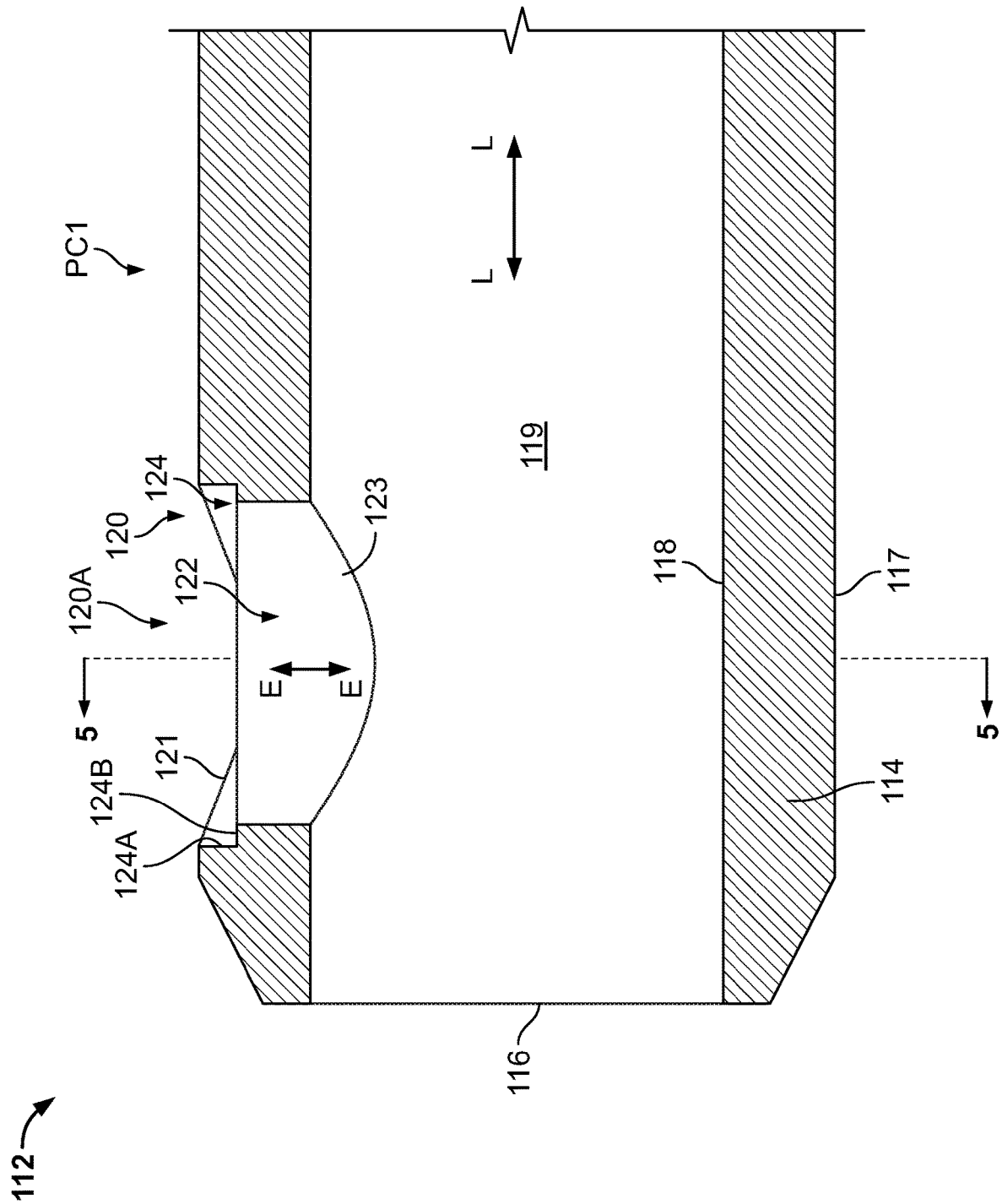

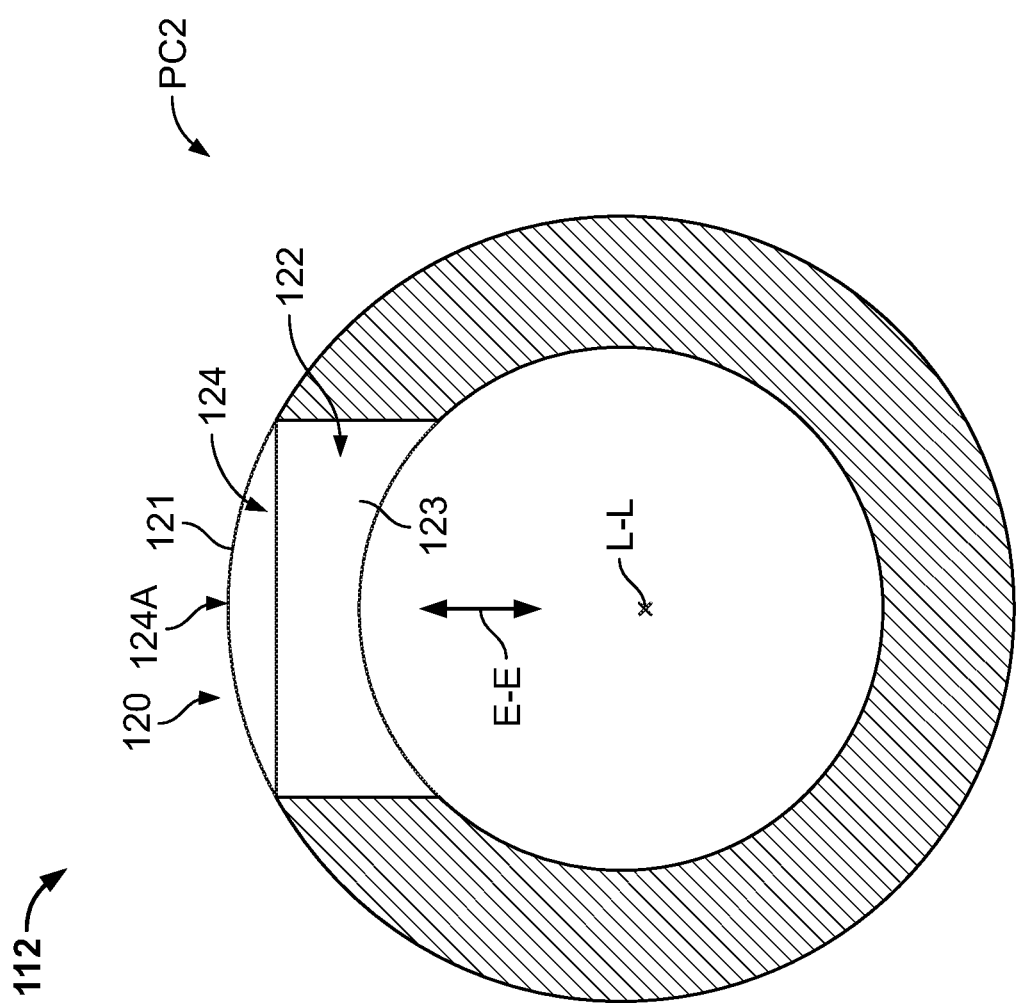

CABLE CONNECTOR SYSTEM AND A METHOD OF CONNECTING ELECTRICAL CABLES

RELATED APPLICATION(S)

The present application claims the benefit of and priority from U.S. Provisional Patent Application No. 62/821,822, filed Mar. 21, 2019, the disclosure of which is incorporated herein by reference in its entirety.

FIELD OF THE INVENTION

The present invention relates to connectors and methods for forming electrical connections.

BACKGROUND OF THE INVENTION

Electrical connectors are used to connect electrical cables, such electrical power transmission cables in an electrical power distribution network. In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

In some applications, cable ends are secured to a cable using fastening bolts. In some applications, it is desirable or necessary to install a fastener, such as a bolt, with a prescribed torque, thereby ensuring that the bolt is installed to a tightness in a desired range. Although a torque-controlled driver (e.g., a torque wrench) may be employed for this purpose, a torque-controlled driver may be unavailable or inconvenient. Torque-controlled fasteners such as shear bolts have been designed to provide torque control integral with the fastener. Examples of shear bolt fasteners include one-piece shear bolts provided with electrical connectors available from TE Connectivity. Some of these shear bolts include a one-piece bolt member having a head, a threaded shaft, and one or more shear sections defined in the shaft. During installation, a driver is used to apply torque to the head until the shaft shears at one of the shear sections, whereupon the head breaks off and a remaining portion of the fastener remains to fasten the cable.

When electrical connections are formed, a bare metal surface may be exposed such as a splice connector. If the connection is made between two insulated cables, it is assumed the connection is in a harsh environment, such as a water-filled duct or buried under rocks. In turn, it is necessary to effectively rebuild the cable's electrical insulation, metallic shield, and environmental protection over this connection. If the connection was energized without rebuilding the cable layers, the metallic connection may fail immediately or very soon after. Thus, there is a need to protect such electrical connections from the environment.

SUMMARY OF THE INVENTION

According to some embodiments, a cable connector system for connecting electrical cables includes a connector and a plug. The connector includes a connector body and a shear bolt. The connector body includes a connector outer surface and a bolt bore intersecting the connector outer surface at a bore opening. The connector outer surface is curved. The shear bolt is configured to be mounted in the bolt bore to secure an electrical cable in the connector body. The plug includes a head and is configured to be mounted in the bolt bore at the bore opening. The head has a head outer surface and the head outer surface is curved.

According to some embodiments, a method for connecting electrical cables includes providing a cable connector system for connecting electrical cables. The cable connector system includes a connector and a plug. The connector includes a connector body and a shear bolt. The connector body includes a connector outer surface and a bolt bore intersecting the connector outer surface at a bore opening. The connector outer surface is curved. The shear bolt is configured to be mounted in the bolt bore to secure an electrical cable in the connector body. The plug includes a head and is configured to be mounted in the bolt bore at the bore opening. The head has a head outer surface and the head outer surface is curved. The method further includes: securing an electrical cable in the connector body using the shear bolt; and inserting the plug into the bolt bore.

According to some embodiments, a connection assembly includes an electrical cable; and a cable connector system. The cable connector system includes a connector and a plug. The connector includes a connector body and a shear bolt. The connector body includes a connector outer surface and a bolt bore intersecting the connector outer surface at a bore opening. The connector outer surface is curved. The shear bolt is configured to be mounted in the bolt bore to secure an electrical cable in the connector body. The plug includes a head and is configured to be mounted in the bolt bore at the bore opening. The head has a head outer surface and the head outer surface is curved. The electrical cable is secured in the connector body by the shear bolt. The plug is mounted in the bolt bore.

According to some embodiments, a cable connector system for connecting electrical cables includes a connector and a plug. The connector includes a connector body and a shear bolt. The connector body includes a connector outer surface and a bolt bore intersecting the connector outer surface at a bore opening. The shear bolt is configured to be mounted in the bolt bore to secure an electrical cable in the connector body. The plug includes a head and is configured to be mounted in the bolt bore at the bore opening. The shear bolt is adapted to be screwed down into the bolt bore to secure a cable in the connector. The shear bolt is configured to break apart upon application of sufficient torque to the shear bolt, whereupon a first portion of the shear bolt can be removed from the connector body while a remaining portion of the shear bolt remains in the bolt bore, the remaining portion including a bolt cavity defined therein. The plug includes a base integral with the head. The base is configured to be received in the bolt cavity such that the base forms an interference fit with the remaining portion to thereby secure the plug in the bolt bore.

According to some embodiments, a method for connecting electrical cables includes providing a cable connector system for connecting electrical cables. The cable connector system includes a connector and a plug. The connector includes a connector body and a shear bolt. The connector body includes a connector outer surface and a bolt bore intersecting the connector outer surface at a bore opening. The shear bolt is configured to be mounted in the bolt bore to secure an electrical cable in the connector body. The plug includes a head and a base integral with the head, wherein the plug is configured to be mounted in the bolt bore at the bore opening. The method further includes: securing an electrical cable in the connector body by screwing the shear bolt into the bolt bore until the shear bolt breaks apart into a first portion and a remaining portion; removing the first portion of the shear bolt from the connector body while the remaining portion remains in the bolt bore, the remaining portion including a bolt cavity defined therein; and inserting the plug into the bolt bore such that the base is received in the bolt cavity and the base forms an interference fit with the remaining portion to thereby secure the plug in the bolt bore.

According to some embodiments, a connection assembly includes an electrical cable; and a cable connector system. The cable connector system includes a connector and a plug. The connector includes a connector body and a shear bolt. The connector body includes a connector outer surface and a bolt bore intersecting the connector outer surface at a bore opening. The shear bolt is configured to be mounted in the bolt bore to secure an electrical cable in the connector body. The plug includes a head and a base integral with the head, wherein the plug is configured to be mounted in the bolt bore at the bore opening. The electrical cable is secured in the connector body by a remaining portion of the shear bolt that remains in the connector body following removal of a first portion of the shear bolt, the remaining portion including a bolt cavity defined therein. The plug is mounted in the bolt bore such that the base is received in the bolt cavity and the base forms an interference fit with the remaining portion to thereby secure the plug in the bolt bore.

BRIEF DESCRIPTION OF THE DRAWINGS

FIG. 3 is a top view of the connector body of FIG. 2.

FIG. 4 is a cross-sectional view of the connector body of FIG. 2 taken along the line 4-4 of FIG. 3.

FIG. 5 is a cross-sectional view of the connector body of FIG. 2 taken along the line 5-5 of FIG. 4.

DETAILED DESCRIPTION

Figure 1:
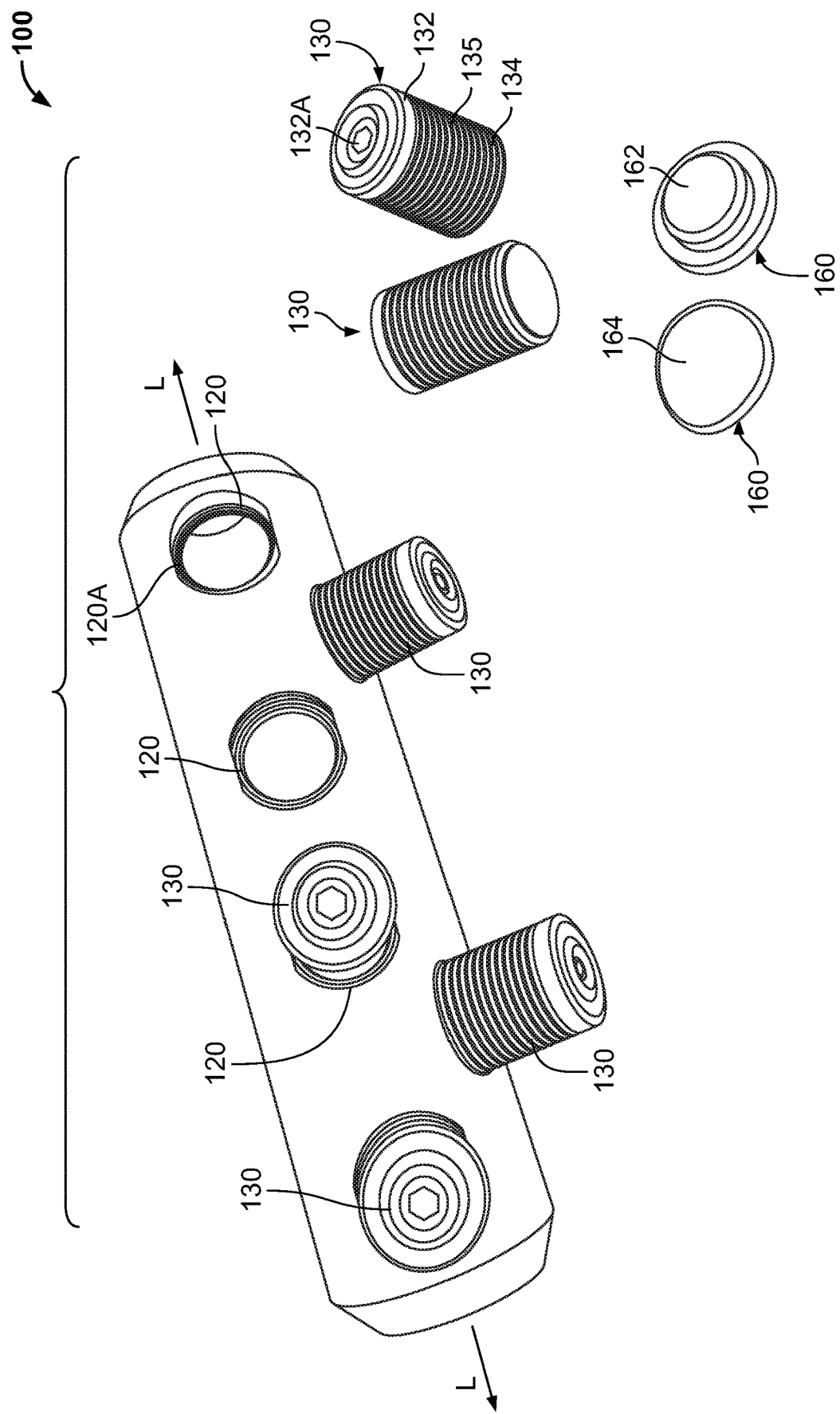
FIG. 1 is a perspective view of a cable connector system according to some embodiments.
Figure 2:
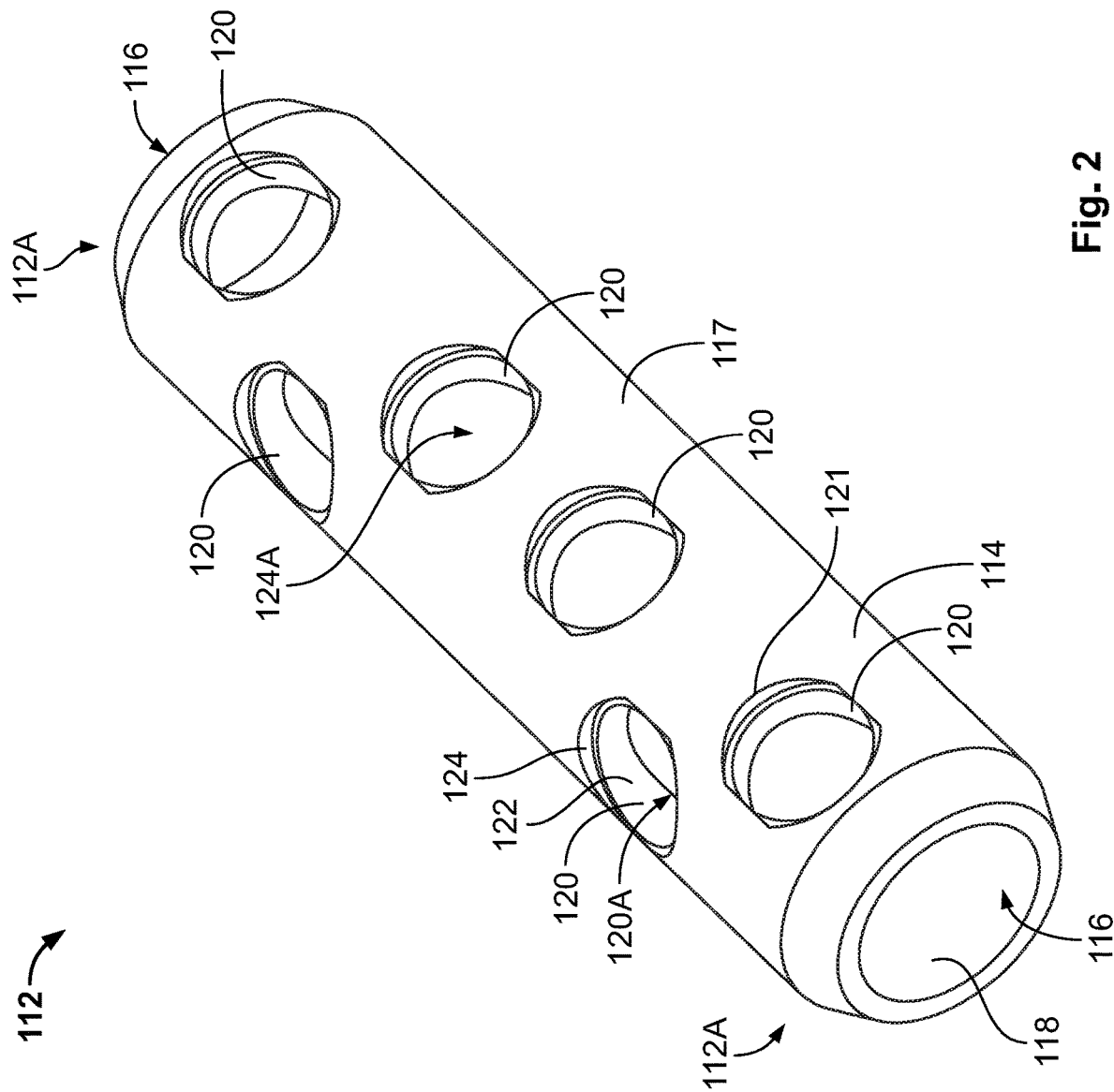
FIG. 2 is a perspective view of a connector body forming a part of the cable connector system of FIG. 1.
Figure 7:
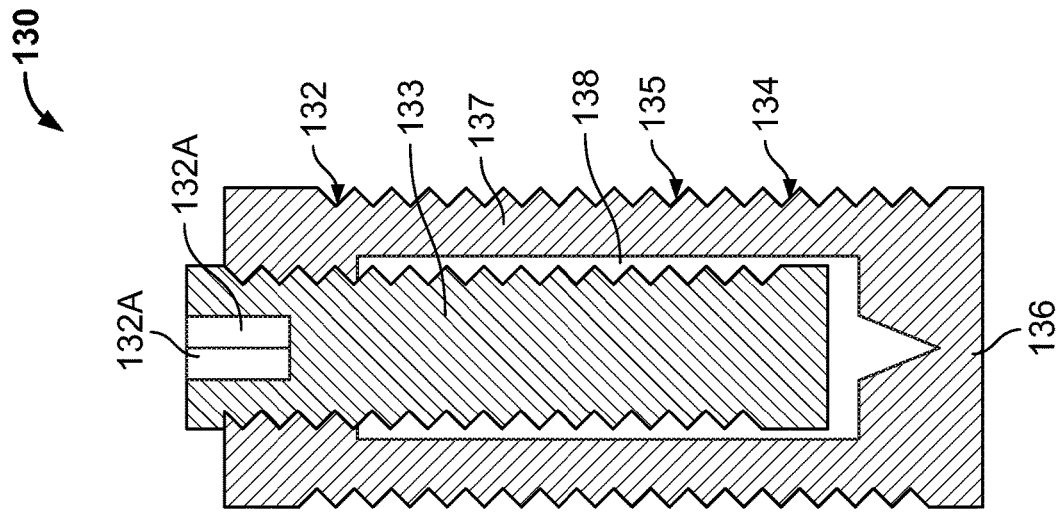
FIG. 7 is a cross-sectional view of the shear bolt of FIG. 6 taken along the line 7-7 of FIG. 6.
Figure 6:
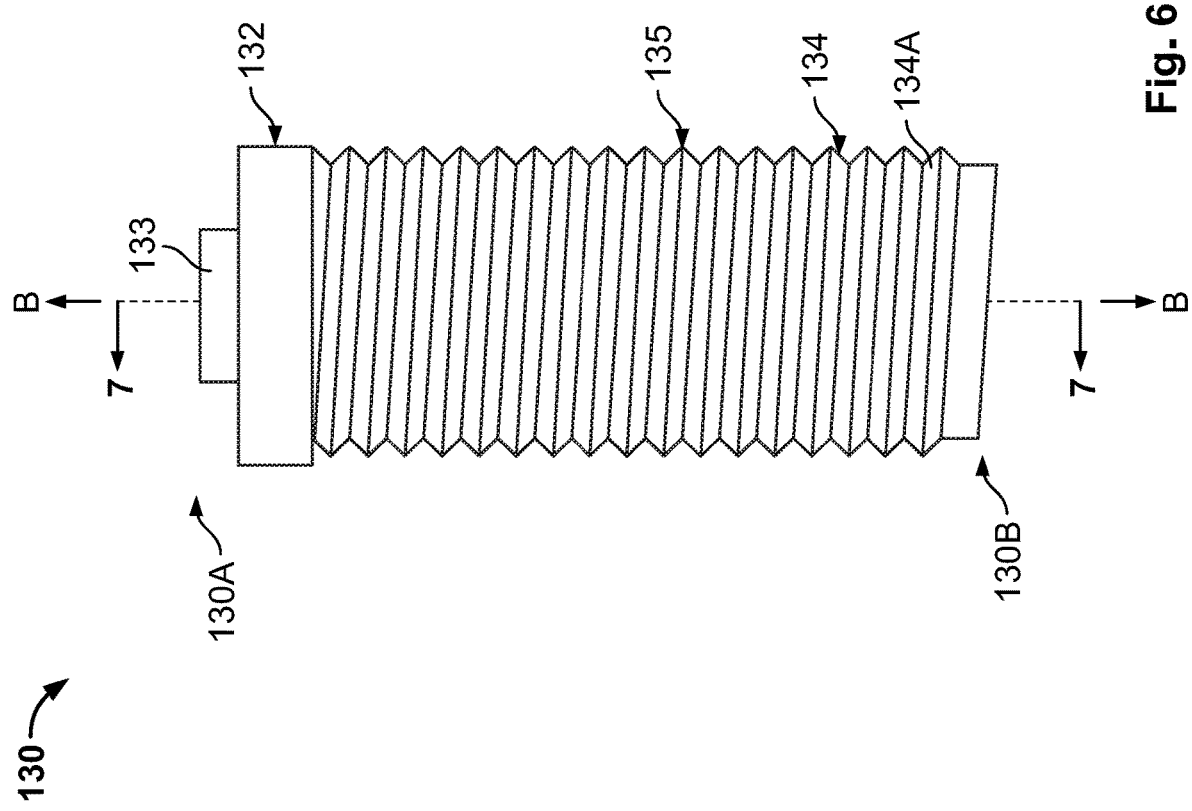
FIG. 6 is a side view of a shear bolt forming a part of the cable connector system of FIG. 1.
Figure 8:
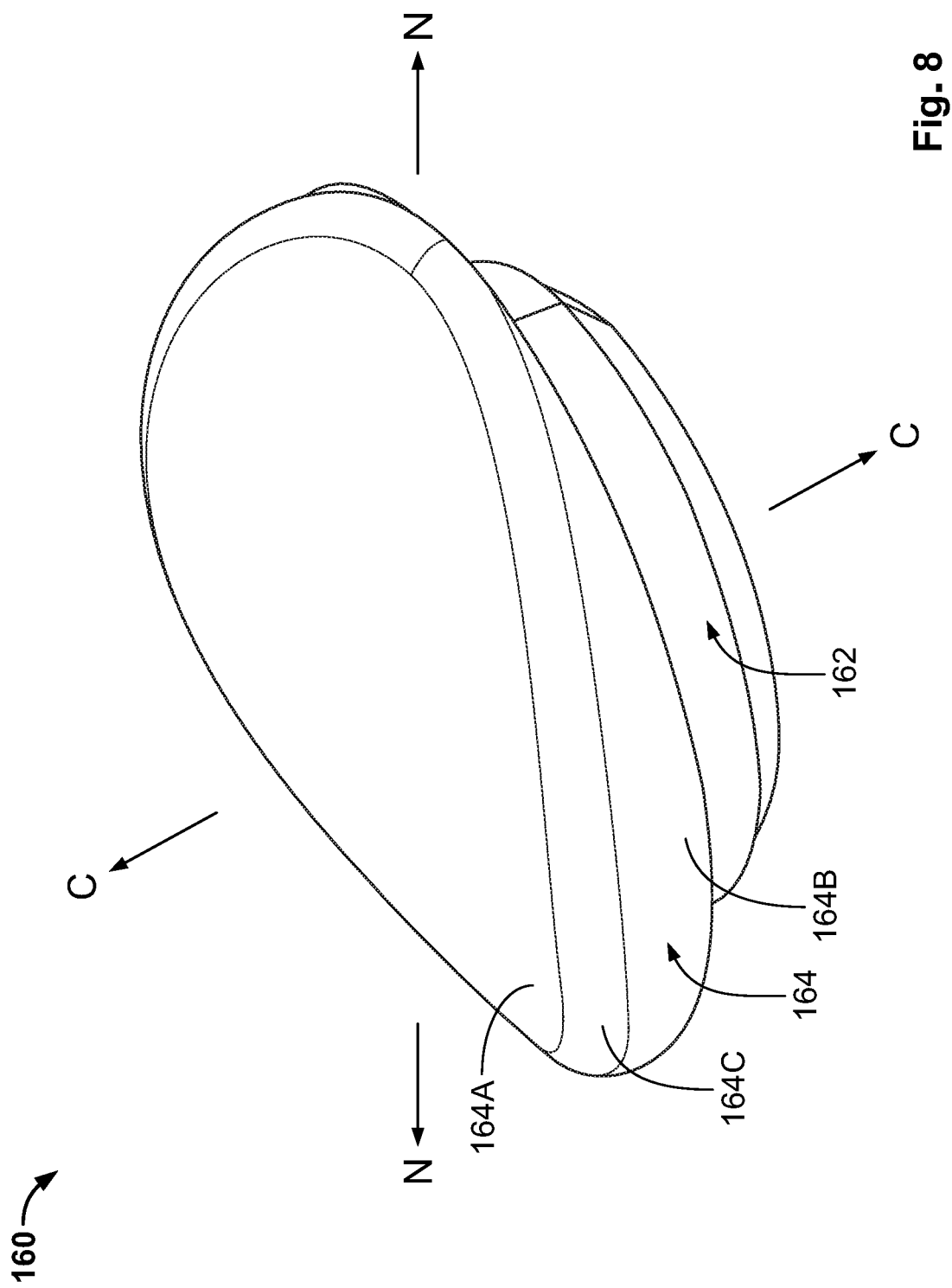
FIG. 8 is a top perspective view of a plug forming a part of the cable connector system of FIG. 1.
Figure 9:
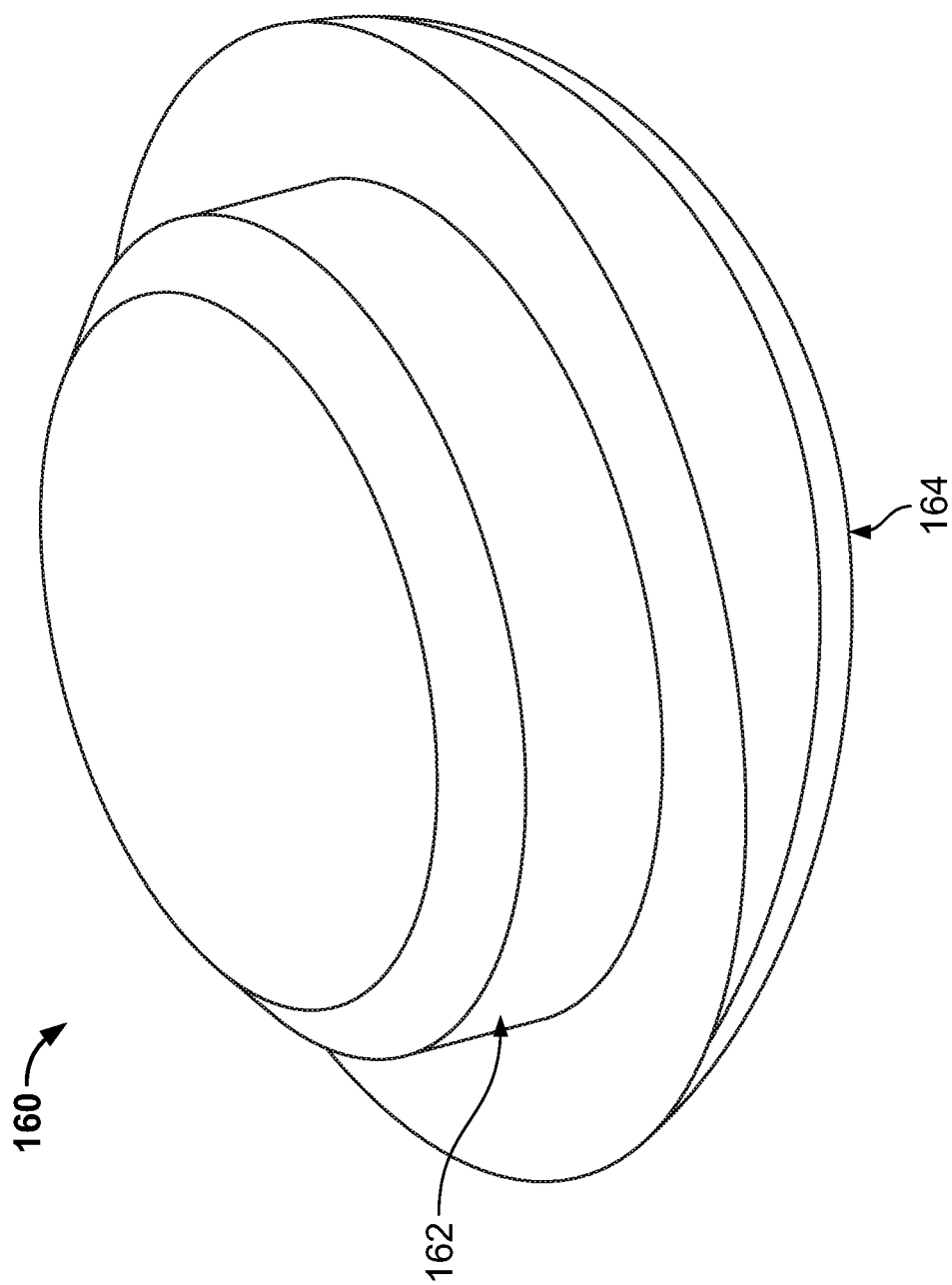
FIG. 9 is a bottom perspective view of the plug of FIG. 8.
Figure 10:
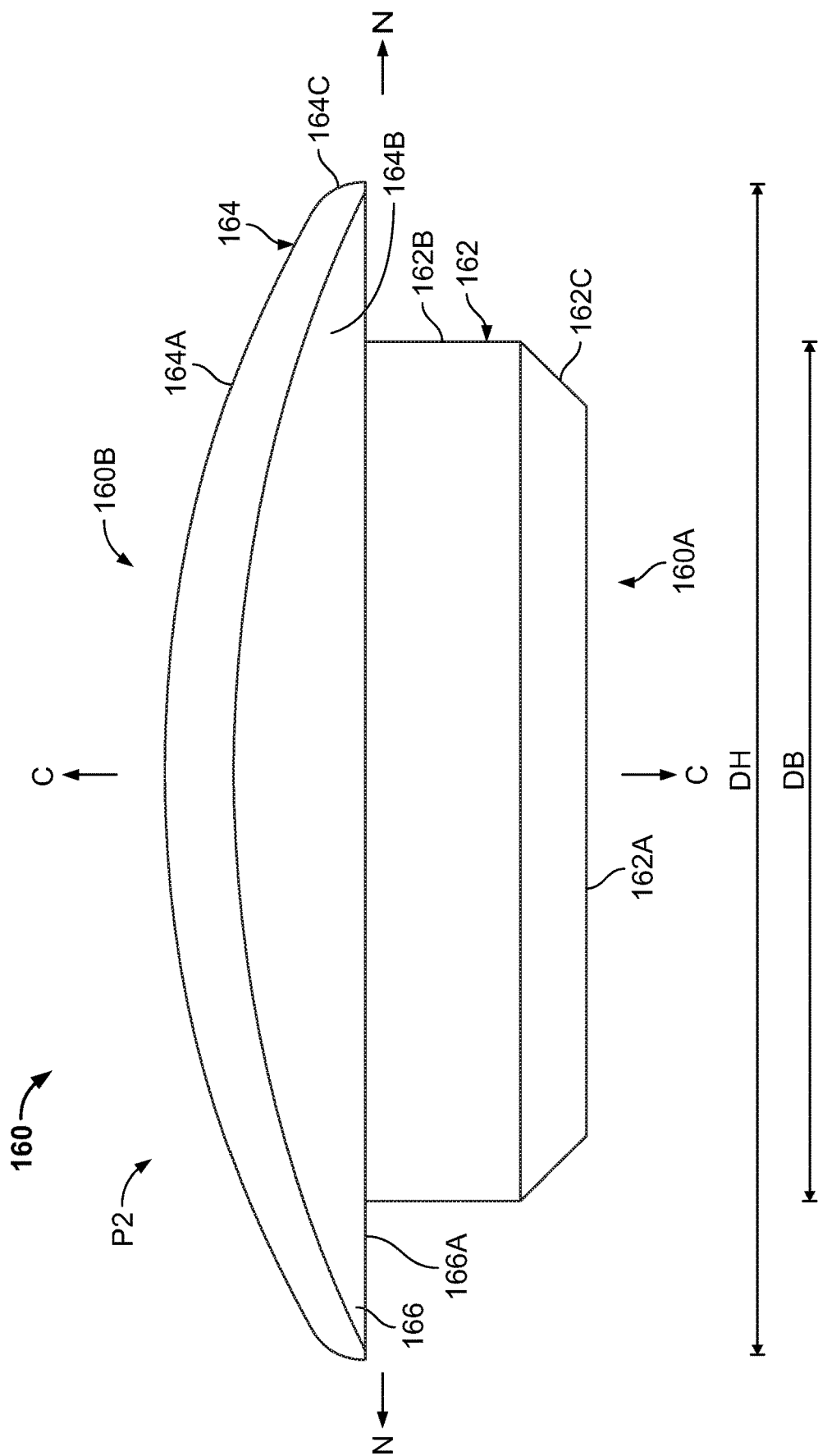
FIG. 10 is a first side view of the plug of FIG. 8.
Figure 11:
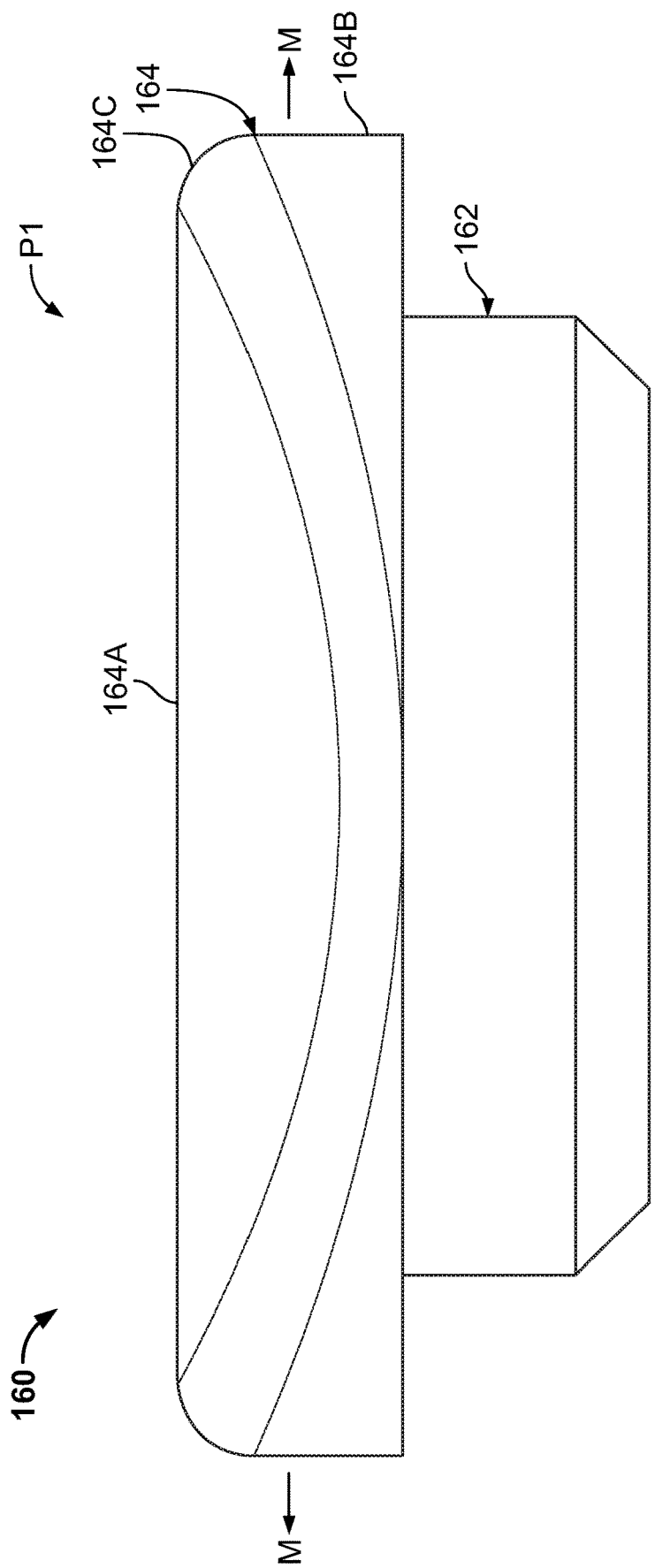
FIG. 11 is a second side view of the plug of FIG. 8.
Figure 12:
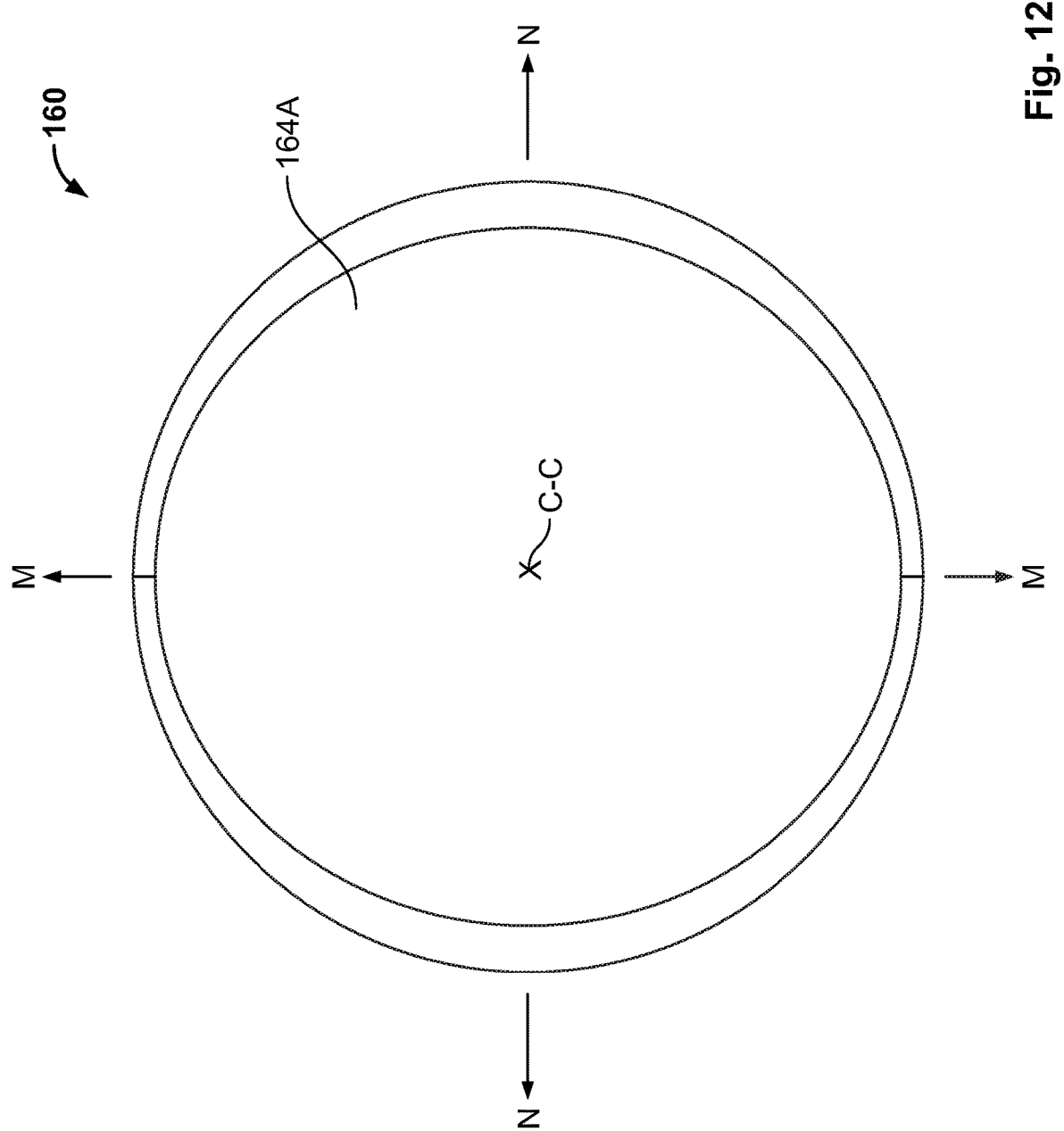
FIG. 12 is a top view of the plug of FIG. 8.
Figure 13:
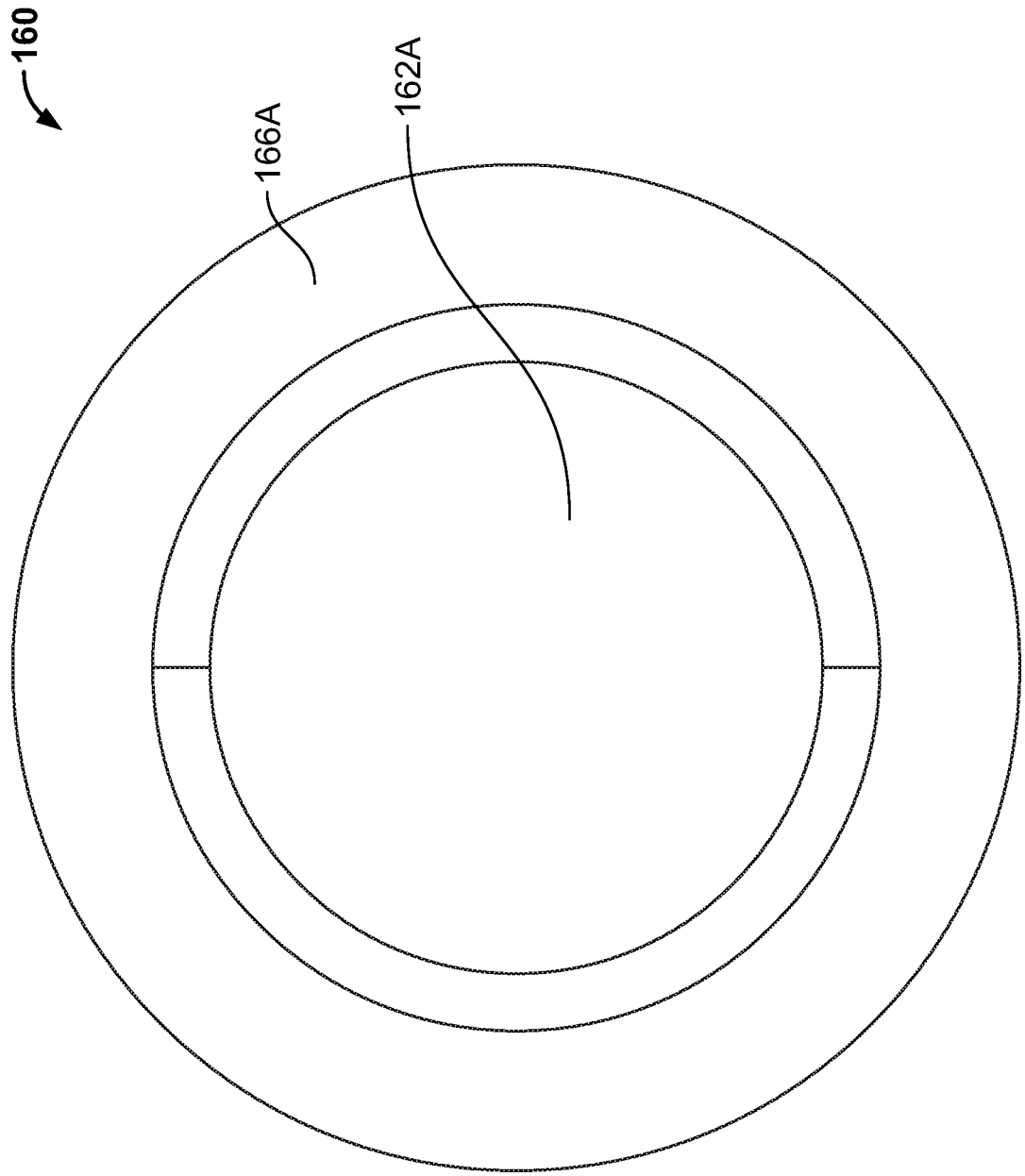
FIG. 13 is a bottom view of the plug of FIG. 8.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

As used herein, "monolithic" means an object that is a single, unitary piece formed or composed of a material without joints or seams.

Figure 18:
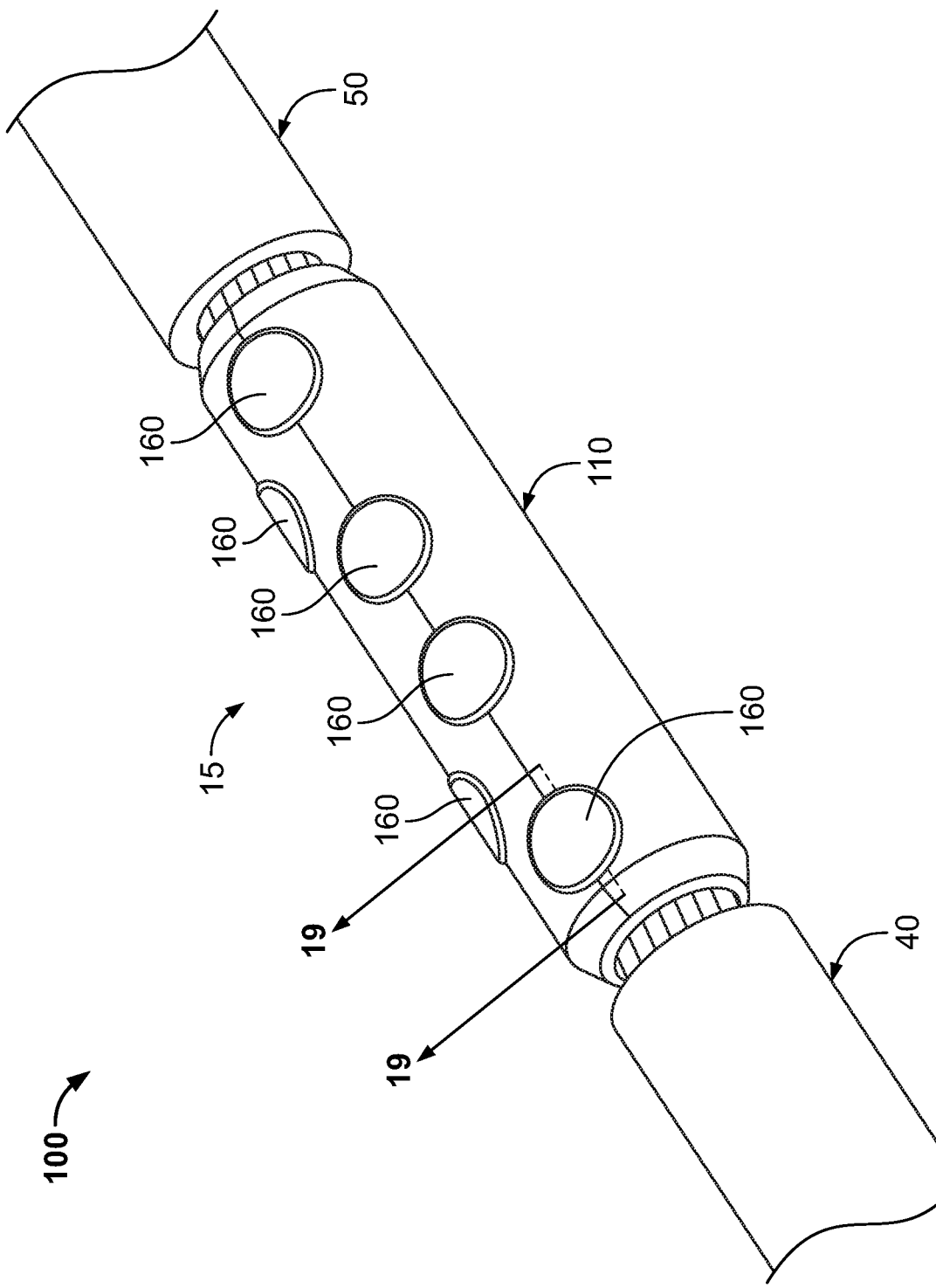
FIG. 18 is a perspective view of a connection assembly formed using the cable connector system of FIG. 1.
Figure 19:
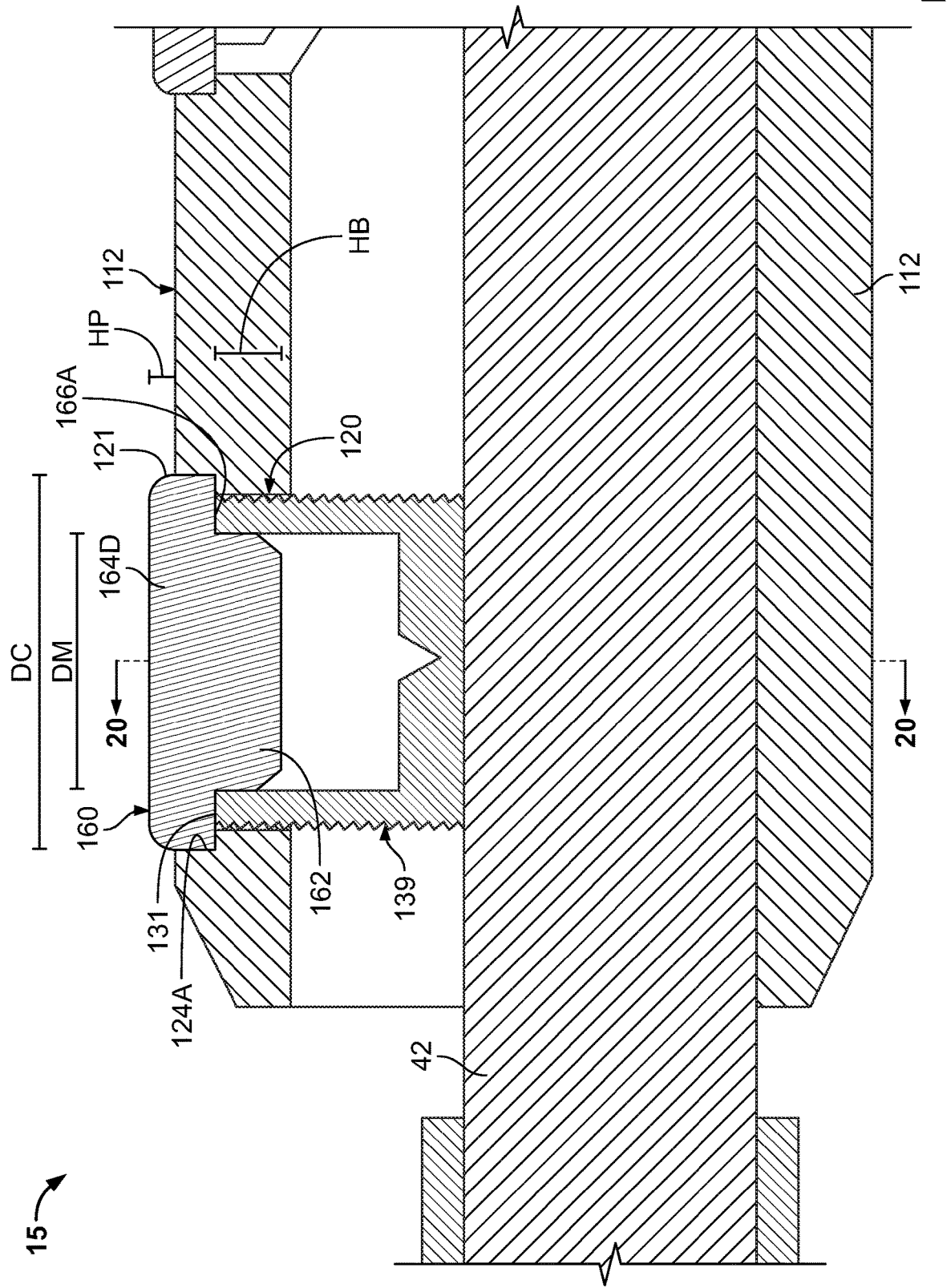
FIG. 19 is a cross-sectional view of the connection assembly of FIG. 18 taken along the line 19-19 of FIG. 18.
Figure 20:
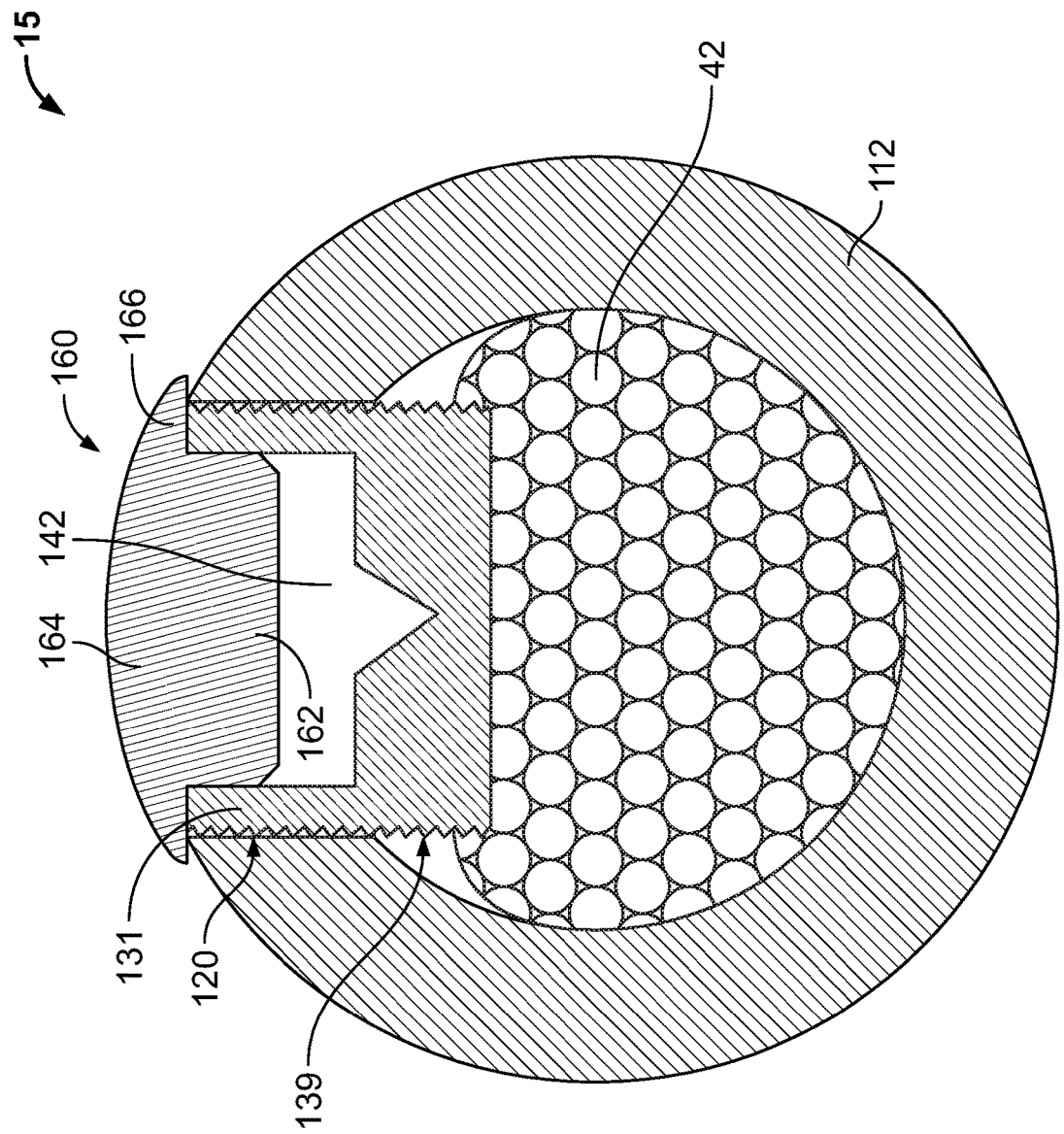
FIG. 20 is a cross-sectional view of the connection assembly of FIG. 18 taken along the line 20-20 of FIG. 19.

With reference to the figures, a cable connector system 100 according to some embodiments of the present invention is shown therein. The connector system 100 may be used to form a connection assembly 15 (FIGS. 18-20). The connector system 100 can be used in combination with a cover system 180 to form a protected connection system 101

Figure 21:
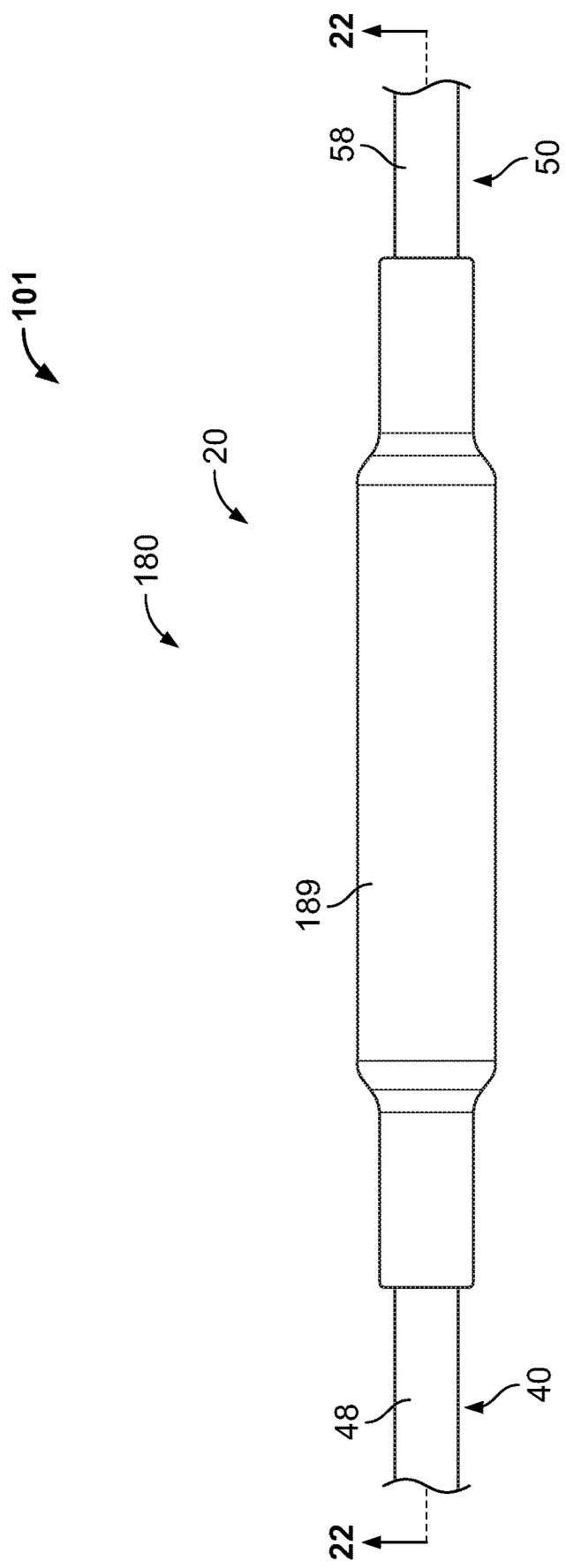
FIG. 21 is a side view of a protected connection assembly formed using the cable connector system of FIG. 1.
Figure 22:
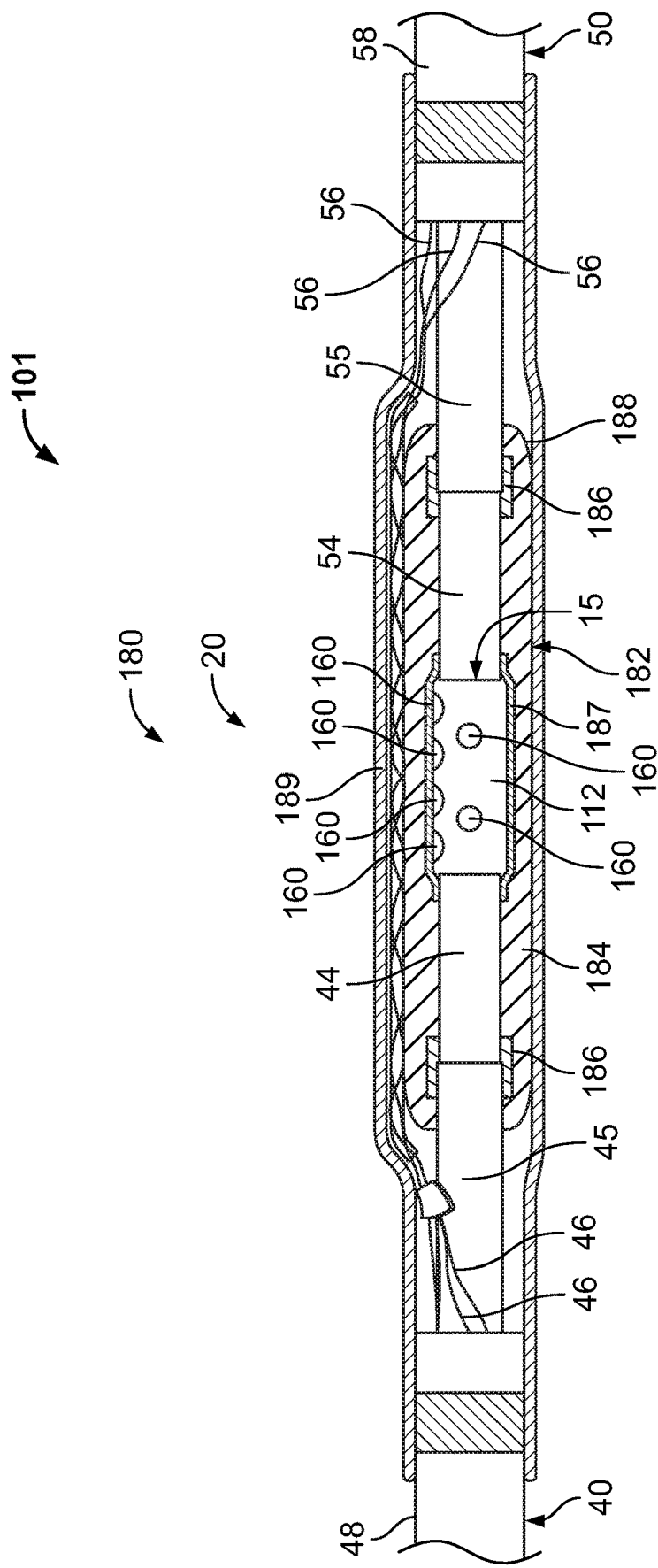
FIG. 22 is a cross-sectional view of the protected connection assembly of FIG. 21 taken along the line 22-22 of FIG. 21.

(FIGS. 21 and 22). The protected connection system 101 may in turn be used to form a protected connection assembly 20 including two or more connected cables (for example, cables 40, 50 as shown in FIGS. 21 and 22).

In some embodiments, the connector system 100 is provided as a pre-packaged kit of components for subsequent assembly by an installer (e.g., a field installer) using a method as described herein. In some embodiments, the protected connection system 101 is provided as a pre-packaged kit of components for subsequent assembly by an installer (e.g., a field installer) using a method as described herein.

The connector system 100 includes an electrical connector 110 and a set 161 of protective connector inserts, caps, or plugs 160. In FIG. 1, only two of the caps 160 are shown. However, typically the system (and the pre-packaged kit, if applicable) would include one cap 160 for each bore 120 of the connector 110.

According to some embodiments and as shown, the connector 110 is a shear bolt connector 110. With reference to FIGS. 1-7, the shear bolt connector 110 includes an electrically conductive (e.g., metal) connector body 112 and a plurality of shear bolts 130. The connector 110 has a lengthwise axis L-L.

The connector body 112 has a lengthwise axis extending substantially parallel to or concentric with the lengthwise axis L-L. The connector body 112 has opposed ends 112A.

The connector body 112 has a tubular sidewall 114. An inner surface 118 of the sidewall 114 defines opposed end openings 116 and an axially extending central or conductor receiving bore 119 terminating at the end openings 116.

An outer surface 117 of the sidewall 114 is arcuate and generally cylindrical. Thus, it will be appreciated that the outer surface 117 has a substantially linear profile PC1 (FIG. 4) in a cross-section parallel to the central axis L-L, and a curvilinear or arcuate profile PC2 (FIG. 5) in a cross-section orthogonal to the central axis L-L. In some embodiments, the radius of curvature of the outer surface in the profile PC2 is in that range of from about 25 to 100 mm.

Bolt holes or bores 120 are defined in the sidewall 114. The bores 120 are axially and circumferentially distributed across the body 112. Each bore 120 has a central axis E-E and extends radially through the sidewall 114 fully from the outer surface 117 to the inner surface 118.

Each bore 120 includes an inner or main section 122 and an outer section or counterbore 124. The main section 122 includes a screw thread 123 on its inner diameter.

Each bore 120 terminates at the outer surface 117 at an opening 120A. Each opening 120A forms an annular corner or edge 121 at the intersection between the bore 120 and the outer surface 117.

The shear bolts 130 (FIGS. 1, 6 and 7) may each be constructed and used in the same manner. Therefore, only one of the shear bolts 130 will be described in detail hereinbelow, it being understood that this discussion applies likewise to the other shear bolts 130.

The shear bolt 130 has a lengthwise axis B-B (FIG. 6), an outer or proximal end 130A, and an opposing inner or distal end 130B.

The shear bolt 130 is unitary and includes a head or drive section 132 at the proximal end 130A, a shank 134 at the distal end 130B, and a shearing or breakaway section 135 located between the drive section 132 and the shank 134. The shank 134 terminates an engagement surface 136.

The drive section 132 includes a driver engagement feature 132A, such as a faceted socket. The driver engagement feature 132A is configured to operably engage a driver so that the shear bolt 130 can be forcibly rotated about the axis B-B by the driver.

The shank 134 includes a sidewall 140 defining a bore 138 in the shank 134. The outer diameter of the shank 134 includes a screw thread 134A.

In use, the threaded section 134A of the shank 134 is threadedly engaged with the bore thread 123 of a respective one of the bores 120. The shank 134 extends through the bore 120 such that the engagement surface 136 is located proximate the central bore 119 and the driver engagement feature 132A is accessible from outside the connector body 112. In some embodiments and as shown, the drive section 132 projects radially outwardly beyond the outer surface 117.

The shear bolt 130 is adapted to be screwed down into its respective bolt bore 120 to clamp a conductor in the underlying conductor bore 119. The drive section 132 on the shear bolt 130 is configured to shear off of the threaded shank 134 at the breakaway section 135 when subjected to a prescribed torque.

In some embodiments, the shear bolt 130 has a multi-part construction including a shear bolt body 137 and a bolt or screw 133. The shear bolt body 137 includes the sidewall 140 and the outer screw thread 134A and defines the bore 138. The screw 133 is disposed in the bore 138. The driver engagement feature 132A may form a part of the screw 133. When the shear bolt 130 breaks at the breakaway section 135, the screw 133 is removed with the drive section 132 along with the drive section 132.

The shear bolt 130 (including the shear bolt body 137 and the screw 133) may be formed of any suitable material. According to some embodiments, the shear bolt 130 is formed of a metal (e.g., copper or aluminum).

Shear bolts of other designs and constructions may be used in place of the shear bolts 130.

With reference to FIGS. 8-13, the plugs 160 may each be constructed and used in the same manner. Therefore, only one of the plugs 160 will be described in detail hereinbelow, it being understood that this discussion applies likewise to the other plugs 160.

The plug 160 has a lengthwise axis C-C and opposed distal and proximal ends 160A and 160B. The plug 160 is unitary and includes a base 162 at the distal end 160A, and a head 164 at the proximal end 160B.

The base 162 has a generally cylindrical sidewall 162B and a substantially planar inner face 162A. An annular chamfer or taper 162C is located between the surfaces 162A and 162B.

The head 164 has an outer surface 164A, a sidewall 164B, and an annular radius or rounded shoulder 164C at the outer peripheral edge connecting the surfaces 164A and 164B.

The outer diameter DH of the head 164 is greater than the outer diameter DB of the base 162 so that the head 164 defines an annular flange 166 extending radially outward beyond the base 162. The flange 166 has an inwardly facing flange surface 166A.

The outer surface 164A of the head 164 is curved to fit or generally match the contours of the outer surface 117 of the connector body 112, as discussed below.

The head 164 has a first lateral axis M-M perpendicular to the lengthwise axis C-C, and a second lateral axis N-N perpendicular to the lengthwise axis C-C and perpendicular to the first lateral axis M-M.

The outer surface 164 has a substantially linear or rectilinear profile P1 (FIG. 11) in a cross-section along the first lateral axis M-M.

The outer surface 164 has a curvilinear or arcuate profile P2 (FIG. 10) in a cross-section along the second lateral axis N-N. In some embodiments, the curvature of the profile P2 is uniform and constant. The shape of the profile P2 is convex.

In some embodiments, the radius of curvature of the outer surface in the profile P2 is in that range of from about 25 to 100 mm.

The plug 160 may be formed of any suitable material. According to some embodiments, the plug 160 is formed of a resiliently deformable material. According to some embodiments, the plug 160 is formed of an elastomeric material. According to some embodiments, the plug 160 is formed of silicone rubber. Other suitable elastomeric materials may include ethylene-propylene-diene-monomer (EPDM) rubber, butyl rubber or nitrile rubber.

According to some embodiments, the plug 160 is formed of an electrically insulating elastomer.

According to some embodiments, the plug 160 is formed of an electrically conductive elastomer.

According to some embodiments, the plug 160 has a Shore A hardness in the range of from about 25 to 75.

The plug 160 may be formed using any suitable technique. According to some embodiments, the plug 160 is molded and, according to some embodiments, injection molded. Alternatively, the plug 160 may be stamped. According to some embodiments, the plug 160 is monolithic.

The cover system 180 (FIGS. 21 and 22) includes a tubular inner sleeve or joint body 182 and a tubular outer sleeve or rejacket sleeve 189. In some embodiments, the components 182, 189 are provided on and deployed from a holdout. The components may be provided pre-expanded on a single holdout, or on respective individual holdouts. In some embodiments, the cover system 180 includes only the rejacket sleeve 189.

The joint body 182 includes a tubular insulation layer 184, a pair of axially opposed, tubular stress cone layers 186, a Faraday cage layer 187, and a tubular outer semiconductive layer 188. In some embodiments, the Faraday cage layer 187, the stress cone layers 186, and the insulation layer 184 are bonded (e.g., adhered or molded) together to form a unitary component.

The insulation layer 184 can be formed of any suitable material. According to some embodiments, the insulation layer 184 is formed of a dielectric or electrically insulative material. According to some embodiments, the insulation layer 184 is formed of an elastically expandable material. According to some embodiments, the insulation layer 184 is formed of an elastomeric material. According to some embodiments, the insulation layer 184 is formed of liquid silicone rubber (LSR). Other suitable materials may include EPDM or ethylene propylene rubber (EPR). According to some embodiments, the insulation layer 184 has a Modulus at 100 percent elongation (M100) in the range of from about 0.4 to 0.52 MPa.

The Faraday cage layer 187 is a generally tubular sleeve bonded to the inner surface of the insulation layer 184. The Faraday cage layer 187 may be formed of a suitable electrically conductive elastomer. In use, the Faraday cage layer 187 may form a Faraday cage to provide an equal potential volume about the connector 110 so that an electric field is cancelled in the surrounding air voids.

The stress cone layers 186 are generally tubular sleeves bonded to the inner surface of the insulation layer 184 at either end thereof. The stress cone layers 186 may be formed of a suitable electrically conductive elastomer. In use, the stress cone layers 186 may serve to redistribute the voltage along the surface of the cable insulation 44, 54 to reduce or prevent the degradation of the insulation 44, 54 that might otherwise occur.

The semiconductive layer 188 may be formed of any suitable semiconductor material such as carbon black with silicone.

The rejacket sleeve 189 can be formed of any suitable material. According to some embodiments, the rejacket sleeve 189 is formed of an electrically insulative material. According to some embodiments, the rejacket sleeve 189 is formed of an elastically expandable material. According to some embodiments, the rejacket sleeve 189 is formed of an elastomeric material. According to some embodiments, the rejacket sleeve 189 is formed of ethylene propylene diene monomer (EPDM) rubber. Other suitable materials may include neoprene or other rubber.

Figure 14:
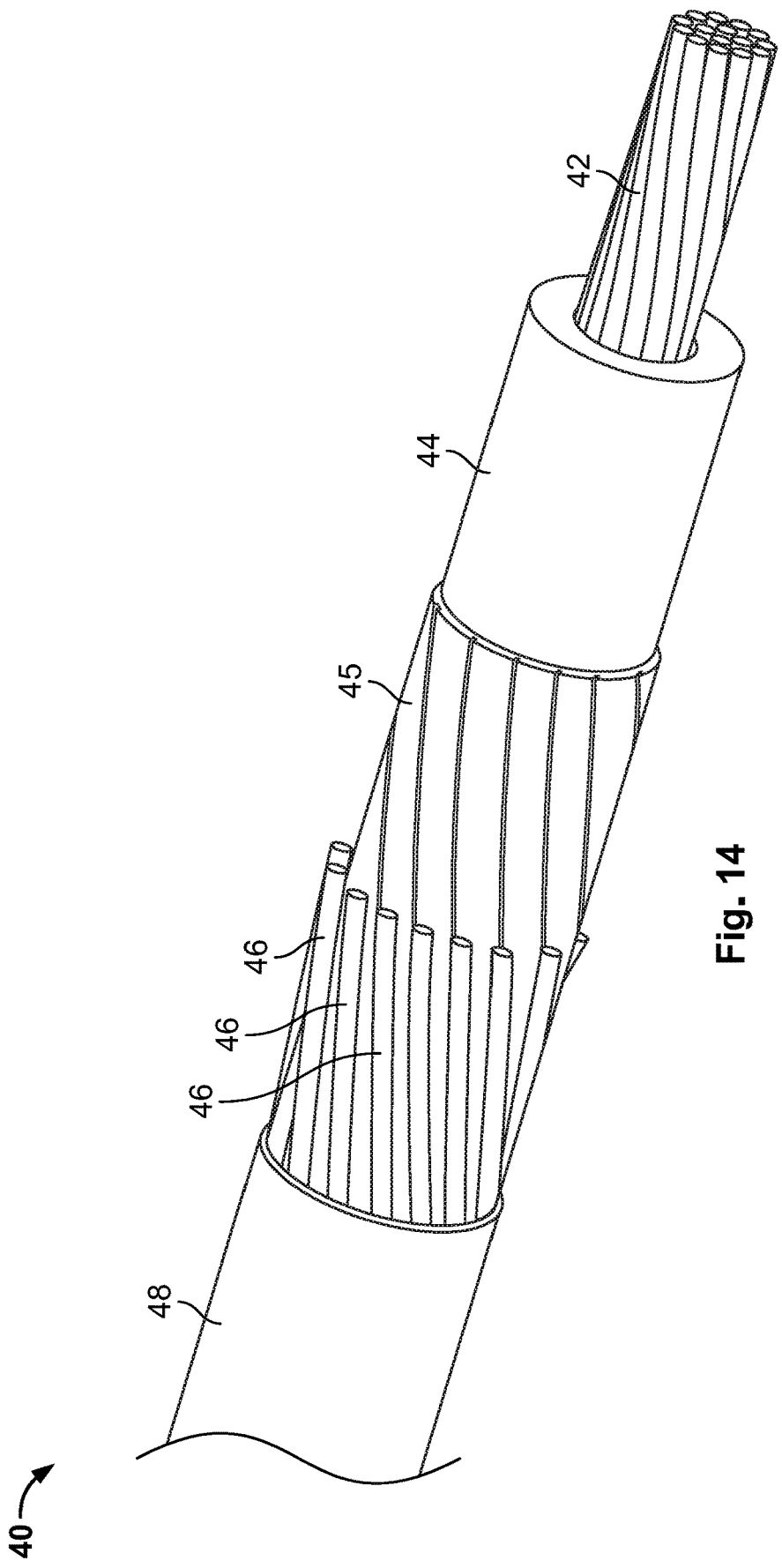
FIG. 14 is a perspective view of an exemplary concentric neutral cable.

Referring now to FIGS. 14-22, the connector system 100 and the protected connection system 101 may be used in the following manner to form a splice connection 20 (FIG. 22) between a pair of electrical power transmission cables 40, 50 including the connection assembly 15 (FIG. 18). According to some embodiments, the cables 40, 50 are low-voltage or medium-voltage (e.g., between about 5 and 46 kV) power transmission cables. As shown in FIG. 14, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The neutral conductors 46 may be formed of any suitable material such as copper. The jacket 48 may be formed of any suitable material such as EPDM. The cable 50 is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

The connection assembly 15 may be formed and the cover assembly 100 may be installed as follows. The cables 40, 50 are prepared as shown in FIG. 22 such that a segment of each layer extends beyond the next overlying layer, except that one or more of the neutral conductors 46, 56 may extend beyond the ends of the respective primary conductors 42, 52.

Figure 15:
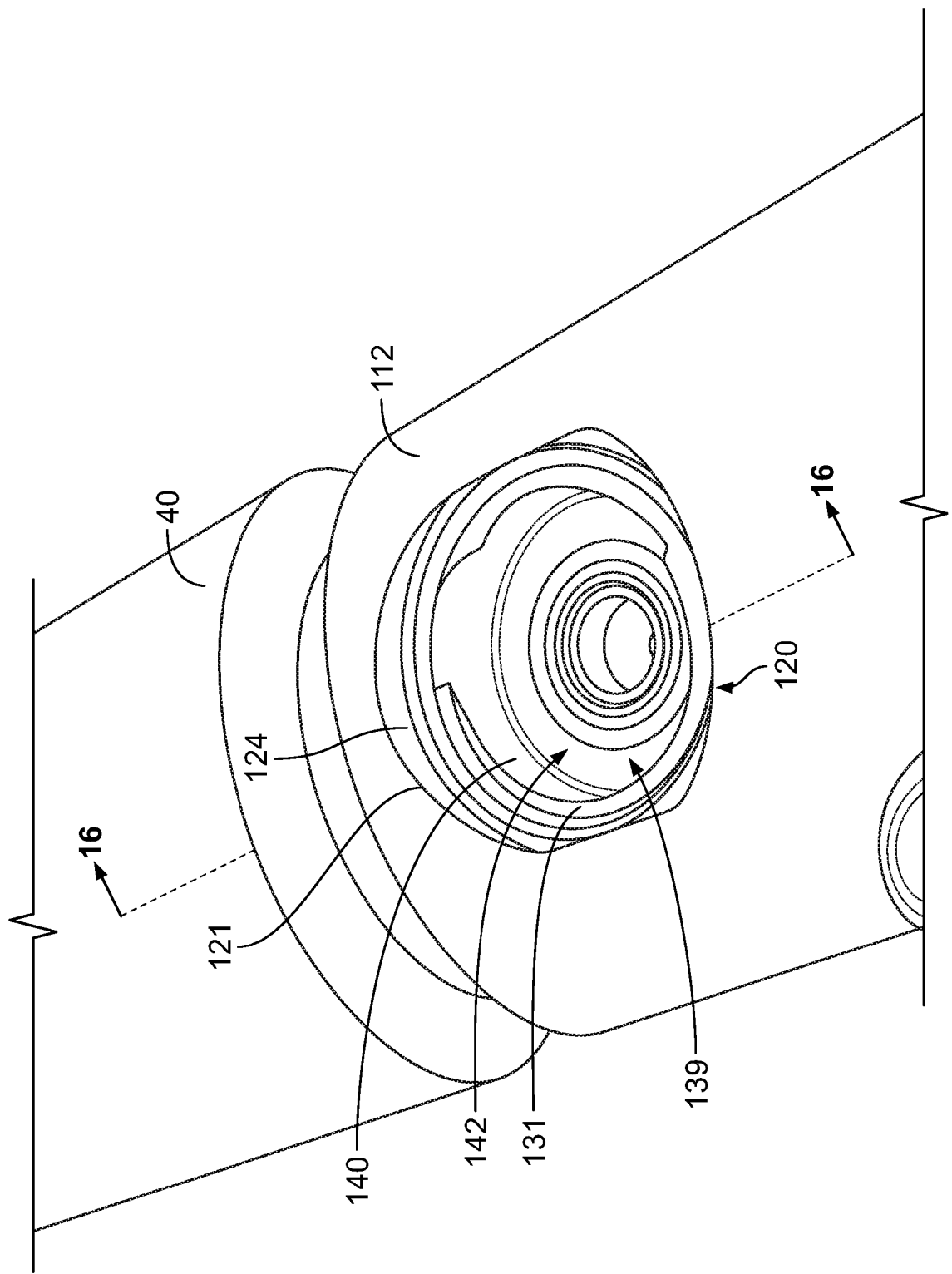
FIG. 15 is an enlarged, fragmentary view of the cable connector system of FIG. 1, wherein a shear bolt has been installed to secure a cable conductor in a connector.
Figure 16:
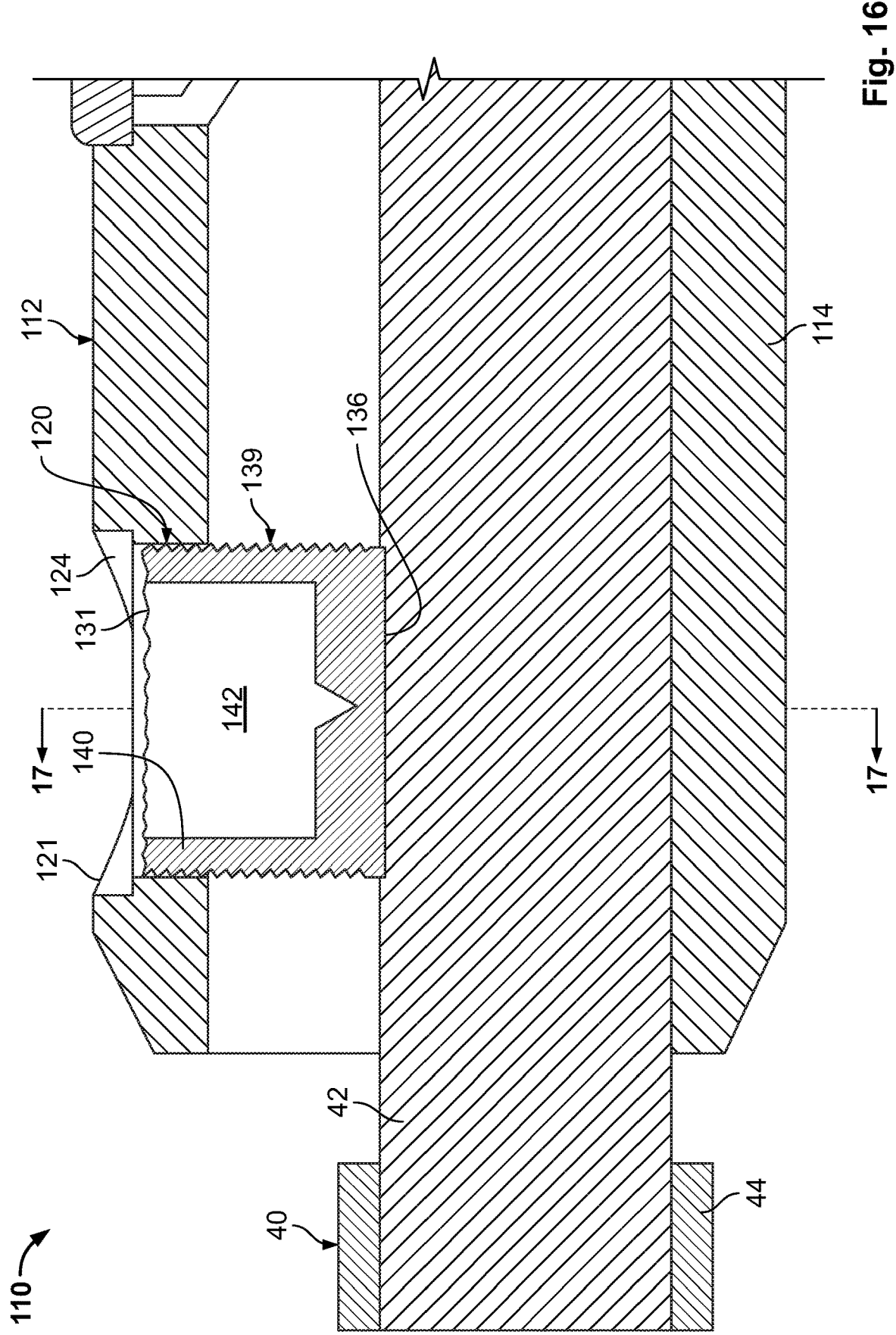
FIG. 16 is a cross-sectional view of the cable connector system of FIG. 15 taken along the line 16-16 of FIG. 15.
Figure 17:
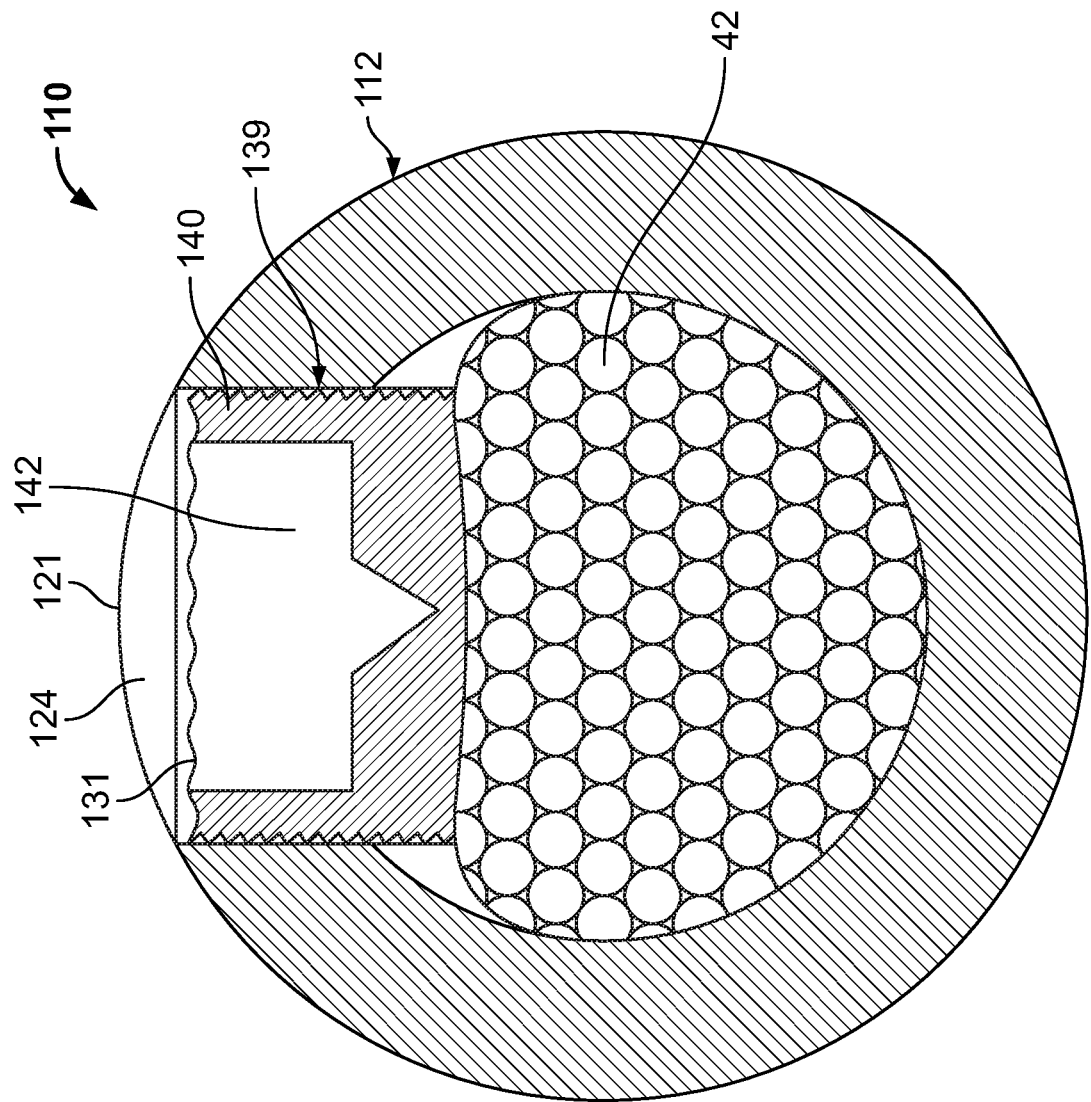
FIG. 17 is a cross-sectional view of the cable connector system of FIG. 15 taken along the line 17-17 of FIG. 16.

The electrical connector 110 is secured to each primary conductor 42, 52 to mechanically and electrically couple the primary conductors 42, 52 to one another as shown in FIGS. 15-17. More particularly, the exposed terminal end of each conductor 42, 52 is inserted into the connector bore 119 through a respective one of the openings 116. The threads 134A of each shear bolt 130 are engaged with the threads 123 of a respective bore 120. Each shear bolt 130 is then screwed down through its bore 120 into contact with a conductor 42, 52. The shear bolts 130 are further driven in (e.g., using a driver engaged with the drive feature 132A) until a prescribed torque is applied to the shear bolt 130. At the prescribed torque, the drive section 132 of the shear bolt 130 shears or breaks off from the shank 134 at the breakaway section 135. The conductors 42, 52 are thereby compressively loaded by the shear bolts 130 and radially clamped between the engagement surfaces 136 of the shear bolts 130 and the opposing portions of the sidewall 114. The electrical connection or splice 15 is thereby formed. The drive sections 132 are removed from the connector and may be discarded.

A remaining portion 139 of each shear bolt 130 remains in the associated bore 120. The portion 139 includes the shank 134 and may include part of the breakaway section 135. The remaining portion 139 includes a portion of the sidewall 140 and a cavity 142 (a portion of the bore 138) defined therein. The remaining portion 139 has an outer or proximal edge 131 where the shear bolt has broken. The outer edge 131 may be irregular or jagged. The proximal edge 131 is located radially inward from the opening 120A of the bore 120 and proximate the bottom of the counterbore 124. In some embodiments, the entirety of the proximal edge 131 is located at or below (radially inward from) the bottom of the counterbore 124.

Each of the plugs 160 is installed in a respective one of the bores 120. Each of the plugs 160 may be installed in the same manner. Therefore, it will be appreciated that the description below applies to each of the plugs 160.

With reference to FIGS. 18-20, the plug 160 is inserted into the bore 120 such that the base 162 is received and seated in the bolt cavity 142, and the head 164 is received and seated in the counterbore 124. In some embodiments, the central axis C-C of the plug 160 is substantially aligned or concentric with the central axis E-E of the bore 120 within which the plug 160 is seated.

The outer diameter DB of the base 162 is slightly larger than the inner diameter DM of the cavity 142 so that an interference fit is formed between the base sidewall 162B and the sidewall 140. The outer diameter DH of the head 164 is slightly larger than the inner diameter DC of the counterbore 124 so that an interference fit is formed between the head sidewall 164B and the counterbore sidewall 124A. These interference fits serve to secure the plug 160 in the bore 120.

In some embodiments, the outer diameter DB is in the range of from about 1 to 15 percent greater than the inner diameter DM.

In some embodiments, the outer diameter DH is in the range of from about 1 to 15 percent greater than the inner diameter DC.

The head 164 is fully seated in the counterbore 124. The height HB of the base 162 is selected such that the base 162 does not bottom out in the cavity 142 when the head 164 is fully seated in the counterbore 124. A radially outer portion of the flange surface 166A may engage the bottom wall 124B of the counterbore 124. A radially inner portion of the flange surface 166A may engage the edge 131 of the remaining portion 139. The soft elastomeric material of the plug 160 can accommodate irregularities in the edge 131 protruding above the bottom wall 124B of the counterbore 124.

In some embodiments, when the plug 160 is seated in the bore 120, the surface 164A of the head 164 is at least flush with the surrounding outer surface 117 of the connector body 112. That is, the head extends at least fully to the top of the bore 120 to fill the opening 120A.

In some embodiments, when the plug 160 is seated in the bore 120, a raised or protruding portion 164D of the head 164 protrudes above the outer surface 117 of the connector body 112. In some embodiments, the protruding portion 164D of the head 164 protrudes above the outer surface 117 a height HP no more than about 3 mm, in some embodiments, in the range of from about 0 to 3 mm and, in some embodiments, in the range of from about 1 mm to 3 mm.

In some embodiments and as illustrated, the protruding portion 164D of the plug head 164 does not overlap the outer surface 117. Instead, the raised portion 164D protrudes or projects radially outwardly (along the axis E-E) beyond the edge 121 while remaining substantially within the footprint of the opening 120A. That is, the plug 160 is substantially contained within a cylindrical volume coaxial with the bore axis E-E and defined by the opening 120A and the bore axis E-E.

The protruding portion 164D has a shape that substantially matches the contours of the adjacent surrounding outer surface 117. The rectilinear profile P1 of the surface 164A extends substantially parallel to the lengthwise rectilinear profile PC1 of the connector surface 117. The curvilinear profile P2 of the surface 164A is substantially concentric with the curvilinear profile PC2 of the connector surface 117.

Once the plugs 160 are installed, the connection assembly 15 is thereby formed.

With reference to FIGS. 21 and 22, the cover system 180 may then be installed over the splice connection 15 to form the protected connection assembly 20. The joint body 182 is installed around the connection assembly 15. The rejacket 189 is installed around the joint body 182. The components 182 and 189 may be installed in sequential steps or in a single step (e.g., from a shared holdout). Once installed, the joint body 182 fits snugly against the connector body 112 and the protruding portions 164D of the plugs 160. In some embodiments, when installed, the joint body 182 is elastically expanded from its relaxed shape so that the joint body 182 applies a persistent radially compressive load against the connector body 112 and the protruding portions 164D. In this way, the joint body 182 ensures that the plugs 160 will not become dislodged from the bores 120.

In some embodiments and as illustrated, the joint body 182 includes an electrical stress control layer such as a Faraday cage 187 that surrounds the connection assembly 15.

In other embodiments, the joint body 182 may be omitted and the rejacket or another protective sleeve or other covering may be applied around the connection assembly 15.

The plugs 160 and connector system 100 can provide a number of benefits in use. Some shear bolt connectors (e.g., as shown in the drawings) use bolts that shear off below the outer diameter surface 117 of the connector body. This sub-surface shear head leaves a sharp edge 131 exposed to any cold shrink or heat shrink sleeves or tubes (e.g., joint body or rejacket) that is collapsed down onto the connector surface. Additionally, the connector body 112 itself presents an exposed edge 121 at the intersection of the outer diameter surface of the connector body 112 and the radial bore hole 120 for the shear bolt 130. This edge 121 may be sharp and can damage any sleeve installed over the top of it, causing the joint to fail.

Plugs and connector systems according to embodiments of the present invention provide a low profile plug that substantially conforms to the shape of the outer surface of the connector body. The plug 160 prevents or substantially inhibits an overlying sleeve (e.g., the joint body 182) from coming into contact with any sharp edges. The plug 160 provides a snug fit with the shear bolt 130 and the bore 120 so that the plug 160 will not come out of place unless it is intentionally peeled away.

The plug 160 can be easily and quickly installed by simply pressing the plug 160 into the bore 120 and the shear bolt 130, without the need for any sealants, adhesives, grease or lubricants. The plug 160 does not require the installer to prepare or shape the plug 160.

The plug 160 requires only one additional installation step with low risk of error.

The plug 160 does not introduce sharp edges that might risk damage to an overlying sleeve.

The plugs 160 still allow significant contact between the connector outer surface 117 and the Faraday cage 187. Therefore, the plugs 160 can be made of an electrically insulating or electrically conductive material.

Further additions or modifications may be made to the systems disclosed herein. For example, in some embodiments, the systems may further include adhesive or sealant to secure the plugs 160 in the bores 120. In some embodiments, the systems may further include grease or lubricant to ease insertion of the plugs 160 into the bores 120.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A cable connector system for connecting electrical cables, the cable connector system comprising:
   a connector including:
      a connector body including:
         a connector outer surface, wherein the connector outer surface is curved; and
         a bolt bore intersecting the connector outer surface at a bore opening; and
      a shear bolt configured to be mounted in the bolt bore to secure an electrical cable in the connector body; and
   a plug including a head and configured to be mounted in the bolt bore at the bore opening;
   wherein the head has a head outer surface and the head outer surface is curve& and
   wherein the plug is formed of an elastomeric material.

2. The cable connector system of claim 1 wherein:
   the connector outer surface has an arcuate profile; and
   the head outer surface has an arcuate profile that substantially matches the arcuate profile of the connector outer surface.

3. The cable connector system of claim 2 wherein:
   the connector outer surface has a rectilinear profile in a cross-section perpendicular to the arcuate profile of the connector outer surface; and
   the head outer surface has a rectilinear profile in a cross-section perpendicular to the arcuate profile of the head outer surface.

4. The cable connector system of claim 1 wherein, when the plug is mounted in the bolt bore, the head outer surface protrudes outwardly beyond the connector outer surface.

5. The cable connector system of claim 1 wherein the head of the plug is configured to form an interference fit with the bolt bore when the plug is mounted in the bolt bore to secure the plug in the bolt bore.

6. The cable connector system of claim 5 wherein:
   the bolt bore includes a threaded main section and a counterbore between the threaded main section and the connector outer surface; and
   the head of the plug is configured to form an interference fit with the counterbore when the plug is mounted in the bolt bore to secure the plug in the bolt bore.

7. The cable connector system of claim 1 wherein:
   the shear bolt is adapted to be screwed down into the bolt bore to secure a cable in the connector;
   the shear bolt is configured to break apart upon application of sufficient torque to the shear bolt, whereupon a first portion of the shear bolt can be removed from the connector body while a remaining portion of the shear bolt remains in the bolt bore, the remaining portion including a bolt cavity defined therein;
   the plug includes a base integral with the head; and
   the base is configured to be received in the bolt cavity such that the base forms an interference fit with the remaining portion to thereby secure the plug in the bolt bore.

8. The cable connector system of claim 1 wherein the elastomeric material has a Shore A hardness in the range of from about 25 to 75.

9. The cable connector system of claim 1 further including an elastomeric sleeve configured to be mounted on the connector body and the plug such that the elastomeric sleeve surrounds the connector body and presses the plug into the bolt bore.

10. The cable connector system of claim 9 wherein the elastomeric sleeve includes an integral Faraday cage that contacts the connector body when the elastomeric sleeve is mounted on the connector body.

11. A cable connector system for connecting electrical cables, the cable connector system comprising:
   a connector including:
      a connector body including:
         a connector outer surface, wherein the connector outer surface is curved; and
         a bolt bore intersecting the connector outer surface at a bore opening; and
      a shear bolt configured to be mounted in the bolt bore to secure an electrical cable in the connector body;
   a plug including a head and configured to be mounted in the bolt bore at the bore opening; and
   an elastomeric sleeve configured to be mounted on the connector body and the plug such that the elastomeric sleeve surrounds the connector body and presses the plug into the bolt bore;
   wherein the head has a head outer surface and the head outer surface is curved.

12. The cable connector system of claim 11 wherein the elastomeric sleeve includes an integral Faraday cage that contacts the connector body when the elastomeric sleeve is mounted on the connector body.

13. A method for connecting electrical cables, the method comprising:
   providing a cable connector system for connecting electrical cables, the cable connector system comprising:
      a connector including:
         a connector body including:
            a connector outer surface, wherein the connector outer surface is curved; and a bolt bore intersecting the connector outer surface at a bore opening; and a shear bolt configured to be mounted in the bolt bore to secure an electrical cable in the connector body; and a plug including a head and configured to be mounted in the bolt bore at the bore opening;

wherein the head has a head outer surface and the head outer surface is curved; and wherein the plug is formed of an elastomeric material;

securing an electrical cable in the connector body using the shear bolt; and inserting the plug into the bolt bore.

14. The method of claim 13 wherein:

the connector body includes a second bolt bore intersecting the connector outer surface at a second bore opening;

the connector includes a second shear bolt;

the cable connector system includes a second plug including a head and configured to be mounted in the second bolt bore at the second bore opening;

wherein the head of the second plug has a curved head outer surface; and the method includes:

securing a second electrical cable in the connector body using the second shear bolt to form a cable splice between the first and second electrical cables; and inserting the second plug into the bolt bore.

15. The method of claim 13 wherein:

the connector outer surface has an arcuate profile; and the head outer surface has an arcuate profile that substantially matches the arcuate profile of the connector outer surface.

16. The method of claim 15 wherein:

the connector outer surface has a rectilinear profile in a cross-section perpendicular to the arcuate profile of the connector outer surface; and the head outer surface has a rectilinear profile in a cross-section perpendicular to the arcuate profile of the head outer surface.

17. The method of claim 13 wherein, when the plug is mounted in the bolt bore, the head outer surface protrudes outwardly beyond the connector outer surface.

18. The method of claim 13 wherein the head of the plug forms an interference fit with the bolt bore when the plug is mounted in the bolt bore to secure the plug in the bolt bore.

19. The method of claim 18 wherein:

the bolt bore includes a threaded main section and a counterbore between the threaded main section and the connector outer surface; and the head of the plug forms an interference fit with the counterbore when the plug is mounted in the bolt bore to secure the plug in the bolt bore.

20. The method of claim 13 including:

securing the electrical cable in the connector body by screwing the shear bolt into the bolt bore until the shear bolt breaks apart into a first portion and a remaining portion;

removing the first portion of the shear bolt from the connector body while the remaining portion remains in the bolt bore, the remaining portion including a bolt cavity defined therein; and inserting the plug into the bolt bore such that the base is received in the bolt cavity and the base forms an interference fit with the remaining portion to thereby secure the plug in the bolt bore.

21. The method of claim 13 wherein the elastomeric material has a Shore A hardness in the range of from about 25 to 75.

22. The method of claim 13 further including mounting an elastomeric sleeve on the connector body and the plug such that the elastomeric sleeve surrounds the connector body and presses the plug into the bolt bore.

23. The method of claim 22 wherein the elastomeric sleeve includes an integral Faraday cage that contacts the connector body when the elastomeric sleeve is mounted on the connector body.

24. A method for connecting electrical cables, the method comprising:

providing a cable connector system for connecting electrical cables, the cable connector system comprising:

a connector including:

a connector body including:

a connector outer surface, wherein the connector outer surface is curved; and a bolt bore intersecting the connector outer surface at a bore opening; and a shear bolt configured to be mounted in the bolt bore to secure an electrical cable in the connector body; and a plug including a head and configured to be mounted in the bolt bore at the bore opening;

wherein the head has a head outer surface and the head outer surface is curved;

securing an electrical cable in the connector body using the shear bolt;

inserting the plug into the bolt bore; and mounting an elastomeric sleeve on the connector body and the plug such that the elastomeric sleeve surrounds the connector body and presses the plug into the bolt bore.

25. The method of claim 24 wherein the elastomeric sleeve includes an integral Faraday cage that contacts the connector body when the elastomeric sleeve is mounted on the connector body.

\* \* \* \* \*